US012202262B2

(12) United States Patent
Nitta et al.

(10) Patent No.: US 12,202,262 B2
(45) Date of Patent: Jan. 21, 2025

(54) INK JET PRINTING APPARATUS, CONTROL METHOD, AND STORAGE MEDIUM

(71) Applicant: CANON KABUSHIKI KAISHA, Tokyo (JP)

(72) Inventors: Masaki Nitta, Kanagawa (JP); Kazuo Suzuki, Kanagawa (JP); Masataka Kato, Kanagawa (JP); Takeshi Murase, Kanagawa (JP); Hiroshi Kawafuji, Tokyo (JP); Hiroshi Taira, Tokyo (JP); Sae Mogi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 17/989,887

(22) Filed: Nov. 18, 2022

(65) Prior Publication Data

US 2023/0191798 A1 Jun. 22, 2023

(30) Foreign Application Priority Data

Dec. 17, 2021 (JP) ................................ 2021-204941

(51) Int. Cl.
*B41J 2/045* (2006.01)
*B41J 2/475* (2006.01)

(52) U.S. Cl.
CPC ......... *B41J 2/0454* (2013.01); *B41J 2/04563* (2013.01); *B41J 2/475* (2013.01); *B41J 2202/08* (2013.01); *B41J 2202/12* (2013.01)

(58) Field of Classification Search
CPC ... B41J 2/0454; B41J 2/04563; B41J 2202/08
See application file for complete search history.

(56) References Cited

U.S. PATENT DOCUMENTS

| | | | |
|---|---|---|---|
| 5,739,828 | A | 4/1998 | Moriyama |
| 6,089,697 | A | 7/2000 | Tajika |
| 6,099,116 | A | 8/2000 | Fujita |
| 6,120,141 | A | 9/2000 | Tajika |
| 6,158,834 | A | 12/2000 | Kato |
| 6,206,502 | B1 | 3/2001 | Kato |
| 6,234,606 | B1 | 5/2001 | Suzuki |

(Continued)

FOREIGN PATENT DOCUMENTS

| | | |
|---|---|---|
| JP | 2006-334967 A | 12/2006 |

*Primary Examiner* — Justin Seo
(74) *Attorney, Agent, or Firm* — Venable LLP

(57) ABSTRACT

An embodiment of the present invention provides an ink jet printing apparatus including: a print head including a printing element array provided with printing elements each configured to generate thermal energy required to eject an ink, a supply flow channel provided along the printing element array and configured to supply the ink to the respective printing elements, an opening provided to the supply flow channel and configured to cause the ink to flow in, and heating units provided along the supply flow channel and configured to heat the ink inside the supply flow channel; and a heating control unit configured to carry out heating control of the heating units based on a heating pattern determined based on heating intensity distribution, the heating intensity distribution representing heating intensities corresponding to the respective heating units and representing the heating intensities corresponding to positions in a direction of the printing element array.

24 Claims, 29 Drawing Sheets

(56) References Cited

U.S. PATENT DOCUMENTS

| | | | | |
|---|---|---|---|---|
| 6,264,320 | B1 | 7/2001 | Moriyama | |
| 6,309,051 | B1 | 10/2001 | Koitabashi | |
| 6,325,492 | B1 | 12/2001 | Koitabashi | |
| 6,390,583 | B1 | 5/2002 | Kato | |
| 6,412,934 | B1 | 7/2002 | Moriyama | |
| 6,450,606 | B1 | 9/2002 | Kato | |
| 6,467,866 | B1 | 10/2002 | Nagoshi | |
| 6,474,768 | B1 | 11/2002 | Yano | |
| 6,494,557 | B1 | 12/2002 | Kato | |
| 6,505,909 | B1 | 1/2003 | Kato | |
| 6,572,216 | B1 | 6/2003 | Koitabashi | |
| 6,585,353 | B1 | 7/2003 | Kanematsu | |
| 6,612,678 | B2 | 9/2003 | Kato | |
| 6,650,350 | B2 | 11/2003 | Suzuki | |
| 6,652,053 | B2 | 11/2003 | Imanaka | |
| 6,834,947 | B2 | 12/2004 | Moriyama | |
| 6,859,220 | B2 | 2/2005 | Suzuki | |
| 6,860,578 | B2 | 3/2005 | Yamada | |
| 6,877,835 | B2 | 4/2005 | Kato | |
| 6,918,656 | B2 | 7/2005 | Koitabashi | |
| 6,986,824 | B2 | 1/2006 | Suzuki | |
| 6,988,783 | B2 | 1/2006 | Ikeda | |
| 6,991,327 | B2 | 1/2006 | Goto | |
| 6,992,690 | B2 | 1/2006 | Mogi | |
| 7,097,267 | B2 | 8/2006 | Kato | |
| 7,125,095 | B2 | 10/2006 | Yamada | |
| 7,347,519 | B2 | 3/2008 | Nagamura | |
| 7,367,643 | B2 | 5/2008 | Furuichi | |
| 7,396,098 | B2 | 7/2008 | Kanematsu | |
| 7,425,056 | B1 | 9/2008 | Koitabashi | |
| 7,517,044 | B2 | 4/2009 | Suzuki | |
| 7,556,343 | B2 | 7/2009 | Kato | |
| 7,775,622 | B2 | 8/2010 | Suzuki | |
| 7,798,593 | B2 | 9/2010 | Nitta | |
| 8,240,802 | B2 | 8/2012 | Nakano | |
| 8,366,230 | B2 | 2/2013 | Taira | |
| 8,371,673 | B2 | 2/2013 | Maru | |
| 8,444,246 | B2 | 5/2013 | Muro | |
| 8,469,484 | B2 | 6/2013 | Jogo | |
| 8,613,492 | B2 | 12/2013 | Suzuki | |
| 8,628,163 | B2 | 1/2014 | Kanematsu | |
| 8,651,616 | B2 | 2/2014 | Maru | |
| 8,675,250 | B2 | 3/2014 | Muro | |
| 8,702,192 | B2 | 4/2014 | Danzuka | |
| 8,740,333 | B2 | 6/2014 | Teshigawara | |
| 8,757,754 | B2 | 6/2014 | Azuma | |
| 8,783,832 | B2 | 7/2014 | Oonuki | |
| 8,888,223 | B2 | 11/2014 | Oonuki | |
| 8,931,869 | B2 | 1/2015 | Kawafuji | |
| 8,931,875 | B2 | 1/2015 | Kosaka | |
| 8,950,843 | B2 | 2/2015 | Oikawa | |
| 9,028,029 | B2 | 5/2015 | Azuma | |
| 9,033,471 | B2 | 5/2015 | Oonuki | |
| 9,039,112 | B2 | 5/2015 | Murayama | |
| 9,079,421 | B2 | 7/2015 | Kato | |
| 9,108,409 | B2 | 8/2015 | Suzuki | |
| 9,114,607 | B2 | 8/2015 | Ishii | |
| 9,126,403 | B2 | 9/2015 | Ojiro | |
| 9,138,991 | B2 | 9/2015 | Murase | |
| 9,545,791 | B2 | 1/2017 | Oonuki | |
| 9,656,459 | B2 | 5/2017 | Kuwabara | |
| 10,214,014 | B2 * | 2/2019 | Komamiya | B41J 2/155 |
| 10,668,717 | B2 | 6/2020 | Azuma | |
| 10,755,151 | B2 | 8/2020 | Ishii | |
| 11,020,959 | B2 | 6/2021 | Murase | |
| 11,077,687 | B2 | 8/2021 | Nishioka | |
| 11,155,078 | B2 | 10/2021 | Umezawa | |
| 11,292,268 | B2 | 4/2022 | Kawafuji | |
| 11,383,536 | B2 | 7/2022 | Genta | |
| 2009/0021548 | A1 | 1/2009 | Suzuki | |
| 2011/0032296 | A1 | 2/2011 | Nakano | |
| 2012/0050364 | A1 | 3/2012 | Honda | |
| 2013/0235107 | A1 | 9/2013 | Ibe | |
| 2017/0297344 | A1 | 10/2017 | Ibe | |
| 2019/0009546 | A1 | 1/2019 | Sakamoto | |
| 2019/0009594 | A1 | 1/2019 | Sakamoto | |
| 2021/0252851 | A1 | 8/2021 | Murase | |
| 2021/0300031 | A1 | 9/2021 | Kawafuji | |
| 2021/0402813 | A1 | 12/2021 | Murase | |
| 2022/0016882 | A1 | 1/2022 | Umezawa | |
| 2022/0080747 | A1 | 3/2022 | Kato | |
| 2022/0080754 | A1 | 3/2022 | Kawafuji | |

* cited by examiner

| HEATING INTENSITY LEVEL | TIMING NO. | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 20 | 1 | 1 | 1 | 1 | 1 | 1 | 1 | 1 | 1 | 1 | 1 | 1 | 1 | 1 | 1 | 1 | 1 | 1 | 1 | 1 |
| 19 | 1 | 1 | 1 | 1 | 1 | 1 | 1 | 1 | 1 | 1 | 1 | 1 | 1 | 1 | 1 | 1 | 1 | 1 | 1 | 0 |
| 18 | 1 | 1 | 1 | 1 | 1 | 1 | 1 | 1 | 1 | 1 | 1 | 1 | 1 | 1 | 1 | 1 | 1 | 1 | 0 | 0 |
| 17 | 1 | 1 | 1 | 1 | 1 | 1 | 1 | 1 | 1 | 1 | 1 | 1 | 1 | 1 | 1 | 1 | 1 | 0 | 0 | 0 |
| 16 | 1 | 1 | 1 | 1 | 1 | 1 | 1 | 1 | 1 | 1 | 1 | 1 | 1 | 1 | 1 | 1 | 0 | 0 | 0 | 0 |
| 15 | 1 | 1 | 1 | 1 | 1 | 1 | 1 | 1 | 1 | 1 | 1 | 1 | 1 | 1 | 1 | 0 | 0 | 0 | 0 | 0 |
| 14 | 1 | 1 | 1 | 1 | 1 | 1 | 1 | 1 | 1 | 1 | 1 | 1 | 1 | 1 | 0 | 0 | 0 | 0 | 0 | 0 |
| 13 | 1 | 1 | 1 | 1 | 1 | 1 | 1 | 1 | 1 | 1 | 1 | 1 | 1 | 0 | 0 | 0 | 0 | 0 | 0 | 0 |
| 12 | 1 | 1 | 1 | 1 | 1 | 1 | 1 | 1 | 1 | 1 | 1 | 1 | 0 | 0 | 0 | 0 | 0 | 0 | 0 | 0 |
| 11 | 1 | 1 | 1 | 1 | 1 | 1 | 1 | 1 | 1 | 1 | 1 | 0 | 0 | 0 | 0 | 0 | 0 | 0 | 0 | 0 |
| 10 | 1 | 1 | 1 | 1 | 1 | 1 | 1 | 1 | 1 | 1 | 0 | 0 | 0 | 0 | 0 | 0 | 0 | 0 | 0 | 0 |
| 9 | 1 | 1 | 1 | 1 | 1 | 1 | 1 | 1 | 1 | 0 | 0 | 0 | 0 | 0 | 0 | 0 | 0 | 0 | 0 | 0 |
| 8 | 1 | 1 | 1 | 1 | 1 | 1 | 1 | 1 | 0 | 0 | 0 | 0 | 0 | 0 | 0 | 0 | 0 | 0 | 0 | 0 |
| 7 | 1 | 1 | 1 | 1 | 1 | 1 | 1 | 0 | 0 | 0 | 0 | 0 | 0 | 0 | 0 | 0 | 0 | 0 | 0 | 0 |
| 6 | 1 | 1 | 1 | 1 | 1 | 1 | 0 | 0 | 0 | 0 | 0 | 0 | 0 | 0 | 0 | 0 | 0 | 0 | 0 | 0 |
| 5 | 1 | 1 | 1 | 1 | 1 | 0 | 0 | 0 | 0 | 0 | 0 | 0 | 0 | 0 | 0 | 0 | 0 | 0 | 0 | 0 |
| 4 | 1 | 1 | 1 | 1 | 0 | 0 | 0 | 0 | 0 | 0 | 0 | 0 | 0 | 0 | 0 | 0 | 0 | 0 | 0 | 0 |
| 3 | 1 | 1 | 1 | 0 | 0 | 0 | 0 | 0 | 0 | 0 | 0 | 0 | 0 | 0 | 0 | 0 | 0 | 0 | 0 | 0 |
| 2 | 1 | 1 | 0 | 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |

FIG.8

| HEATER NO. | H1 | H2 | H3 | H4 (OPENING) | H5 | H6 | H7 (OPENING) | H8 | H9 | H10 |
|---|---|---|---|---|---|---|---|---|---|---|
| HEATING INTENSITY LEVEL | 0 | 5 | 10 | 15 | 5 | 5 | 15 | 10 | 5 | 0 |

FIG.11

| PRINT MODE | PRINT QUALITY | NUMBER OF PASSES | HEATING PATTERN |
|---|---|---|---|
| 1 | FAST | 4 | A |
| 2 | STANDARD | 6 | B |
| 3 | FINE | 12 | C |

FIG.13

| HEATING PATTERN | H1 | H2 | H3 | H4 (OPENING) | H5 | H6 | H7 (OPENING) | H8 | H9 | H10 |
|---|---|---|---|---|---|---|---|---|---|---|
| A (4 PASSES) | 0 | 5 | 10 | 15 | 5 | 5 | 15 | 10 | 5 | 0 |
| B (6 PASSES) | 0 | 3 | 6 | 10 | 3 | 3 | 10 | 6 | 3 | 0 |
| C (12 PASSES) | 0 | 1 | 3 | 5 | 1 | 1 | 5 | 3 | 1 | 0 |

FIG.15

| PRINT MODE | PRINT QUALITY | NUMBER OF PASSES | MASK SHAPE | HEATING PATTERN |
|---|---|---|---|---|
| 1 | FAST | 4 | FLAT | A |
| 4 | FAST | 4 | GRADATION | D |

| HEATING PATTERN | H1 | H2 | H3 | H4 (OPENING) | H5 | H6 | H7 (OPENING) | H8 | H9 | H10 |
|---|---|---|---|---|---|---|---|---|---|---|
| A (FLAT MASK) | 0 | 5 | 10 | 15 | 5 | 5 | 15 | 10 | 5 | 0 |
| D (GRADATION MASK) | 0 | 3 | 6 | 9 | 0 | 0 | 9 | 6 | 3 | 0 |

FIG.18

| PRINT MODE | PRINT QUALITY | NUMBER OF PASSES | CR SPEED | MASK SHAPE | HEATING PATTERN |
|---|---|---|---|---|---|
| 1 | FAST | 4 | 60 ips | FLAT | A |
| 5 | FASTEST | 4 | 80 ips | FLAT | G |

FIG.19

| HEATING PATTERN | H1 | H2 | H3 | H4 (OPENING) | H5 | H6 | H7 (OPENING) | H8 | H9 | H10 |
|---|---|---|---|---|---|---|---|---|---|---|
| A (60 ips) | 0 | 5 | 10 | 15 | 5 | 5 | 15 | 10 | 5 | 0 |
| G (80 ips) | 0 | 5 | 11 | 16 | 6 | 6 | 16 | 11 | 5 | 0 |

FIG.21

| PRINT MODE | PRINT MEDIUM | PRINT QUALITY | NUMBER OF PASSES | CR SPEED | MASK SHAPE | HEATING PATTERN |
|---|---|---|---|---|---|---|
| 1 | PVC-BASED | FAST | 4 | 60 ips | FLAT | A |
| 6 | FABRIC-BASED | FASTEST | 4 | 60 ips | FLAT | H |

FIG.22A

| HEATING PATTERN | H1 | H2 | H3 | H4 (OPENING) | H5 | H6 | H7 (OPENING) | H8 | H9 | H10 |
|---|---|---|---|---|---|---|---|---|---|---|
| A (PVC-BASED) | 0 | 5 | 10 | 15 | 5 | 5 | 15 | 10 | 5 | 0 |
| H (FABRIC-BASED) | 0 | 1 | 3 | 5 | 1 | 1 | 5 | 3 | 1 | 0 |

FIG.22B

| TEMPERATURE DIFFERENCE | PRINT MODE | PRINT QUALITY | NUMBER OF PASSES | CR SPEED | MASK SHAPE | HEATING PATTERN |
|---|---|---|---|---|---|---|
| 40°C ≦ ΔT | 1 | FAST | 4 | 60 ips | FLAT | A |
| 30°C ≦ ΔT < 40°C | 1 | FAST | 4 | 60 ips | FLAT | I |
| 20°C ≦ ΔT < 30°C | 1 | FAST | 4 | 60 ips | FLAT | J |
| 10°C ≦ ΔT < 20°C | 1 | FAST | 4 | 60 ips | FLAT | K |
| ΔT < 10°C | 1 | FAST | 4 | 60 ips | FLAT | L |

FIG.25A

| HEATING PATTERN | H1 | H2 | H3 | H4 (OPENING) | H5 | H6 | H7 (OPENING) | H8 | H9 | H10 |
|---|---|---|---|---|---|---|---|---|---|---|
| A (40°C ≦ ΔT) | 0 | 5 | 10 | 15 | 5 | 5 | 15 | 10 | 5 | 0 |
| I (30°C ≦ ΔT < 40°C) | 0 | 3 | 7 | 10 | 4 | 4 | 10 | 7 | 3 | 0 |
| J (20°C ≦ ΔT < 30°C) | 0 | 2 | 3 | 7 | 3 | 3 | 7 | 3 | 2 | 0 |
| K (10°C ≦ ΔT < 20°C) | 0 | 1 | 2 | 4 | 1 | 1 | 4 | 2 | 1 | 0 |
| L (ΔT < 10°C) | 0 | 0 | 0 | 1 | 0 | 0 | 1 | 0 | 0 | 0 |

FIG.25B

FOR NOZZLE 1

| HEATING PATTERN | H1 | H2 | H3 | H4 (OPENING) | H5 | H6 | H7 (OPENING) | H8 | H9 | H10 |
|---|---|---|---|---|---|---|---|---|---|---|
| A | 0 | 5 | 10 | 15 | 5 | 5 | 15 | 10 | 5 | 0 |

FIG.27A

| HEATING PATTERN | H1 | H2 | H3 (OPENING) | H4 | H5 | H6 (OPENING) | H7 | H8 | H9 | H10 |
|---|---|---|---|---|---|---|---|---|---|---|
| A | 5 | 10 | 15 | 5 | 5 | 15 | 10 | 5 | 2 | 0 |

FIG.27B

| IMAGE DUTY RATIO | INTENSITY CORRECTION COEFFICIENT |
|---|---|
| 0 – 20 % | ×0.2 |
| 21 – 40 % | ×0.4 |
| 41 – 60 % | ×0.6 |
| 61 – 80 % | ×0.8 |
| 81 – 100 % | ×1.0 |

FIG.29A

HEATING PATTERN A

| IMAGE DUTY RATIO [%] | H1 | H2 | H3 | H4 (OPENING) | H5 | H6 | H7 (OPENING) | H8 | H9 | H10 |
|---|---|---|---|---|---|---|---|---|---|---|
| 81 – 100 (×1.0) | 0 | 5 | 10 | 15 | 5 | 5 | 15 | 10 | 5 | 0 |
| 21 – 40 (×0.4) | 0 | 2 | 4 | 6 | 2 | 2 | 6 | 4 | 2 | 0 |

FIG.29B

INK JET PRINTING APPARATUS, CONTROL METHOD, AND STORAGE MEDIUM

BACKGROUND

Field

The present disclosure relates to an ink jet printing apparatus that prints images by ejecting liquids such as inks.

Description of the Related Art

An ink jet printing apparatus supplies inks from ink tanks that store the inks to a print head through supply tubes, and ejects the supplied inks onto a print medium by driving printing elements provided to the print head based in image data, thereby printing a desired image thereon.

In general, in the case where an ink is ejected from the print head, an amount of ejection becomes larger as a temperature of the ink is higher and the amount of ejection becomes smaller as the temperature is lower. Accordingly, it is necessary to keep the temperature of the ink within a predetermined range in order to obtain a stable amount of ejection. To this end, it has been proposed to provide the print head with a heater and a temperature sensor and to control the heater based on a set temperature and on a temperature detected with the temperature sensor.

According to Japanese Patent Laid-Open No. 2006-334967, an amount of temperature drop at a print head associated with printing is predicted based on a temperature difference between a temperature of an ink inside a print head and a temperature of the ink supplied to the print head, and on an amount of the ink necessary for printing to be calculated based on image data in a predetermined region. Then, the temperature is controlled by using a heater so as to make up for the amount of drop.

In recent years, there has been proposed a print head which has a circulation structure that circulates an ink in such a way as to pass through a position of a printing element that ejects the ink in order to improve ink ejection stability. The print head having this circulation structure involves a complicated flow channel configuration. For example, two flow channels communicating with respective printing elements through communication ports are formed along a printing element array. Here, one of the flow channels is a supply flow channel that supplies the ink to each printing element, and the other flow channel is a collection flow channel that collects the ink from each printing element. The supply flow channel communicates with a common supply flow channel through an opening, and the collection flow channel communicates with a common collection flow channel. The common supply flow channel communicates with the common collection flow channel through a pump. Thus, the print head is configured to circulate the ink through these flow channels by driving the pump.

In the case of installing the above-described flow channel structure in a limited space, the supply of the ink from the common supply flow channel to the supply flow channels may be carried out through a limited number of the openings of the supply flow channels. In this flow channel structure, the ink supplied from the opening is passed through the supply flow channel and is supplied to each printing element. Accordingly, time of passage of the ink through the supply flow channel varies depending on the position of the printing element. In the case where the temperature of the supply flow channel is high along with the head temperature, the heat is transmitted to the ink passings therethrough and the temperature of the ink is increased in the case where the time of passage is long. For this reason, the temperature of the supplied ink becomes relatively lower at the printing element located near the opening as compared to the other printing elements. As a consequence, there occurs a temperature difference of the supplied ink depending on the positions of the printing elements.

SUMMARY

However, Japanese Patent Laid-Open No. 2006-334967 is not premised on a situation where the ink supplied to the print head is supplied to the respective printing elements while bearing a temperature variation inside the print head. As a consequence, in the case where a temperature variation regarding the temperature of the supplied ink occurs in a direction in a printing element array, this configuration cannot suppress the temperature variation.

In view of the aforementioned problem, an object of an aspect of the present disclosure is to suppress a temperature variation of a supplied ink in a direction of a printing element arrays, thereby achieving a stable state of ink ejection.

An aspect of the present disclosure is an ink jet printing apparatus including: a print head including a printing element array provided with printing elements each configured to generate thermal energy required to eject an ink, a supply flow channel provided along the printing element array and configured to supply the ink to the respective printing elements, an opening provided to the supply flow channel and configured to cause the ink to flow in, and heating units provided along the supply flow channel and configured to heat the ink inside the supply flow channel; and a heating control unit configured to carry out heating control of the heating units based on a heating pattern determined based on heating intensity distribution, the heating intensity distribution representing heating intensities corresponding to the respective heating units and representing the heating intensities corresponding to positions in a direction of the printing element array.

Further features of the present invention will become apparent from the following description of exemplary embodiments with reference to the attached drawings.

BRIEF DESCRIPTION OF THE DRAWINGS

FIG. 8 is a table holding information concerning ON-OFF states of a driving signal for a heating element;

FIG. 11 is a table holding information on heating intensity levels for respective heating elements;

FIG. 13 is a table holding information on heating patterns for respective print modes;

FIG. 15 is a table holding information on heating intensity levels for respective heating elements;

FIG. 18 is a table holding information on heating intensity levels for respective heating elements;

FIG. 19 is a table holding information on heating patterns for respective print modes;

FIG. 21 is a table holding information on heating intensity levels for respective heating elements;

FIG. 22A is a table holding information on heating patterns for respective print modes and FIG. 22B is a table holding information on heating intensity levels for respective heating elements;

FIG. 25A is a table holding information on heating patterns for respective temperature differences and FIG. 25B is a table holding information on heating intensity levels for respective heating patterns;

FIGS. 27A and 27B are tables holding information on heating intensity levels for respective heating elements;

FIG. 29A is a table holding information on correction coefficients for respective image duty ratios and FIG. 29B is a table holding information on heating intensity levels for respective heating elements.

DESCRIPTION OF THE EMBODIMENTS

Embodiments of the present disclosure will be described below. It is to be noted that the following embodiments are not intended to unnecessarily limit the scope of the present disclosure as defined in the appended claims. Moreover, a combination of all of the features described below is not always essential for a solution of the present disclosure.

Figure 1:
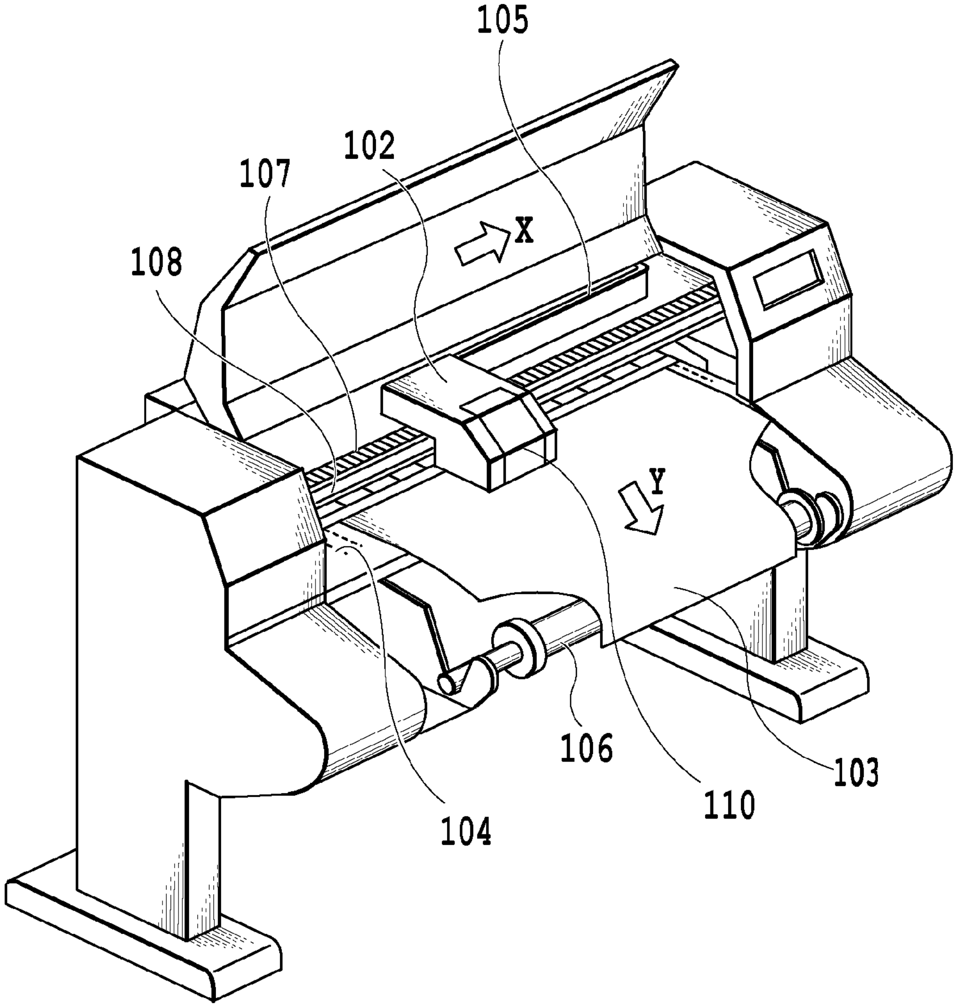
FIG. 1 is a perspective view showing a schematic configuration of a printing apparatus.

FIG. 1 is a perspective view showing external appearance of an ink jet printing apparatus (hereinafter simply referred to as a printing apparatus) according to an embodiment of the present disclosure. This printing apparatus is a printing apparatus of a so-called serial scanning type, which prints images by causing a print head to perform scanning in a scanning direction (x direction) being orthogonal to a direction of transportation (y direction) of a print medium 103. Note that the concept of the present disclosure is also applicable to a print head provided with a print head of a fixed type, namely, a printing apparatus of a line head type.

The print medium 103 is transported in they direction from a spool 106 that holds the print medium 103 by using a transportation roller (not shown) to be driven by a transportation motor 204 (see FIGS. 2A and 2B) through gears. Meanwhile, a carriage unit 102 is caused to perform reciprocation in the x direction along a guide shaft 108, that is, to perform reciprocating scanning by using a carriage motor 205 (see FIGS. 2A and 2B) at a predetermined transportation position. A print head 110 is mounted on the carriage unit 102. Moreover, in the process of this reciprocating scanning, printing elements of the print head are caused to perform an operation to eject ink dots at the timing based on position signals obtained by an encoder 107, thus carrying out image printing for a predetermined bandwidth corresponding to a range of arrangement of the printing elements. Thereafter, the print medium 103 is transported and the image printing is carried out again for the next bandwidth.

The fed print medium 103 is transported in a state of being pinched between a paper feed roller and a pinch roller, and is thus guided to a printing position (the printing position is present within a range of a scanning area of the print head 110) on a platen 104. In a normal quiescent state, a face of the print head 110 is subjected to capping by using a cap (not shown) provided to a recovery unit (not shown). Accordingly, the cap is released prior to printing so as to make the print head 110 and the carriage unit 102 capable of scanning. Thereafter, the carriage motor 205 causes the carriage unit 102 to perform scanning in the case where data equivalent to one scanning operation is accumulated in a buffer, and the printing is carried out as described above.

Here, a carriage belt (not shown) can be used for transmitting driving force from the carriage motor 205 to the carriage unit 102. Other components may be used instead of the carriage belt. For example, it is also possible to use components designed for a different driving method such as a lead screw extending in the x direction and configured to be rotated by the carriage motor 205, and an engagement unit provided to the carriage unit 102 and engaged with grooves on the lead screw.

Meanwhile, inks to be supplied to the print head 110 are supplied from ink tanks (not shown), which are either built in a body or mounted on an external unit and configured to contain the inks, through the carriage unit 102 by using supply tubes 105. The inks may be supplied from the ink tanks to the print head 110 by using a pressurizing unit. Alternatively, the inks may be supplied by capping a nozzle surface of the print head 110 by using the cap of the recovery unit, and suctioning the inks while applying a negative pressure into the cap by using a suction pump.

Here, multiple print heads each being capable of ejecting either an ink of one color or inks of multiple colors may be mounted on the carriage. Alternatively, a single print head being capable of ejecting inks of multiple colors may be mounted on the carriage.

Figure 2A:
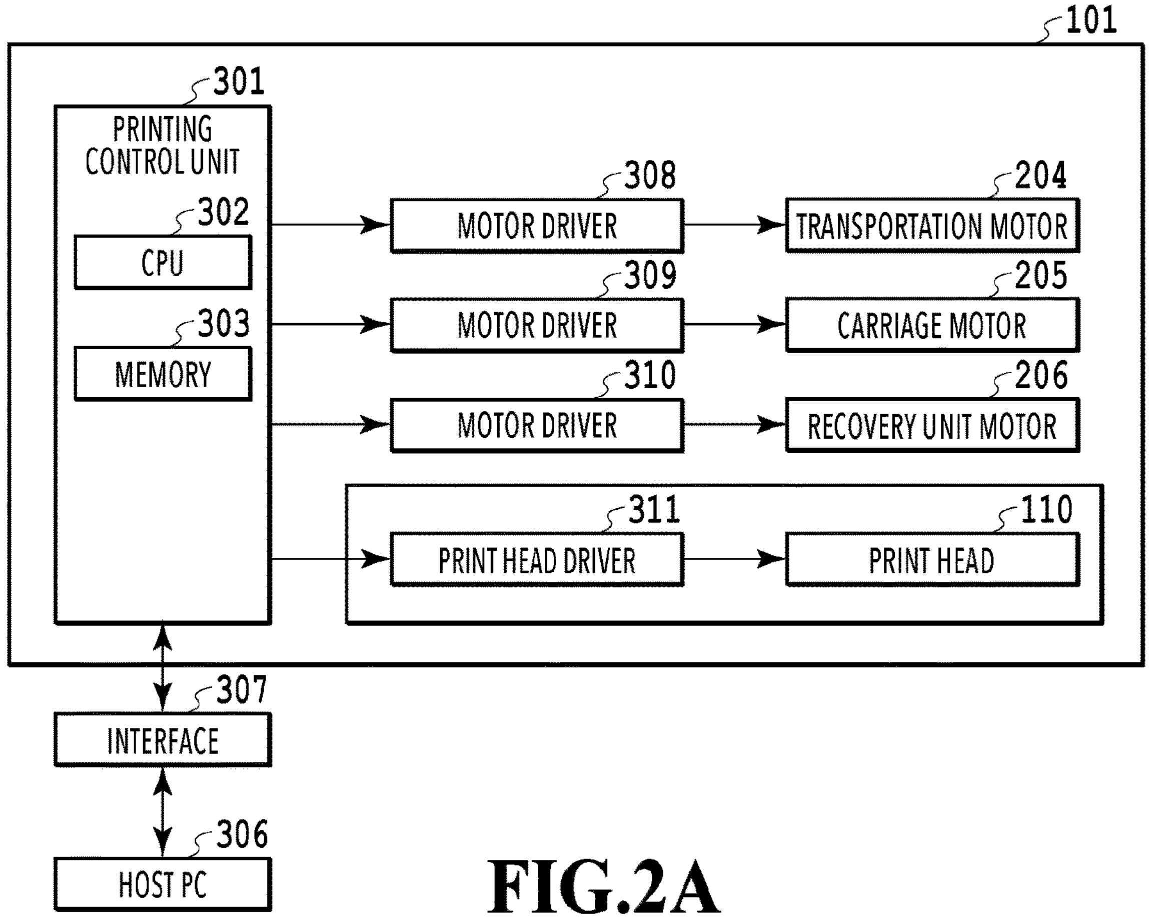
FIG. 2A is a block diagram showing a configuration of a control system of the printing apparatus and FIG. 2B is a schematic diagram for explaining a multipass printing method.

FIG. 2A is a block diagram showing a configuration of a printing control system of the printing apparatus shown in FIG. 1.

A printing apparatus 101 is coupled to a data supply apparatus such as a host computer (hereinafter referred to as a host PC) 306 through an interface 307. Various data, control signals related to printing, and the like transmitted from the host PC 306 are inputted to a printing control unit 301 of the printing apparatus 101.

The printing control unit 301 includes a CPU 302 and a memory 303. The memory 303 stores inputted image data, multivalue gradation data of intermediate products, and multi-pass mask patterns. The CPU 302 is a control operating unit for executing processing by use of the printing apparatus 101 including processing of flows to be described later. Here, an ASIC may be used instead of the CPU 302 or together with the CPU 302. The CPU 302 controls motor drivers and a print head driver to be described later in accordance with control signals inputted through the interface 307. The printing control unit 301 carries out processing of the inputted image data and signals. The transportation motor 204 is a motor for rotating the transportation roller for transporting the print medium 103. The carriage motor 205 is a motor for reciprocating the carriage that mounts the print head 110. A recovery unit motor 206 is a motor which is mounted on the recovery unit (not shown) and configured to switch units to be driven by using a cam shaft and to operate a wiper guide (not shown) and a suction pump (not shown). A motor driver 308 rotates the transportation motor 204. A motor driver 309 rotates the carriage motor 205. A motor driver 310 rotates the recovery unit motor 206. A print head driver 311 is a driver that drives the print head 110. In the case of mounting multiple print heads, multiple print head drivers are provided in conformity with the number of the print heads.

Figure 2B:
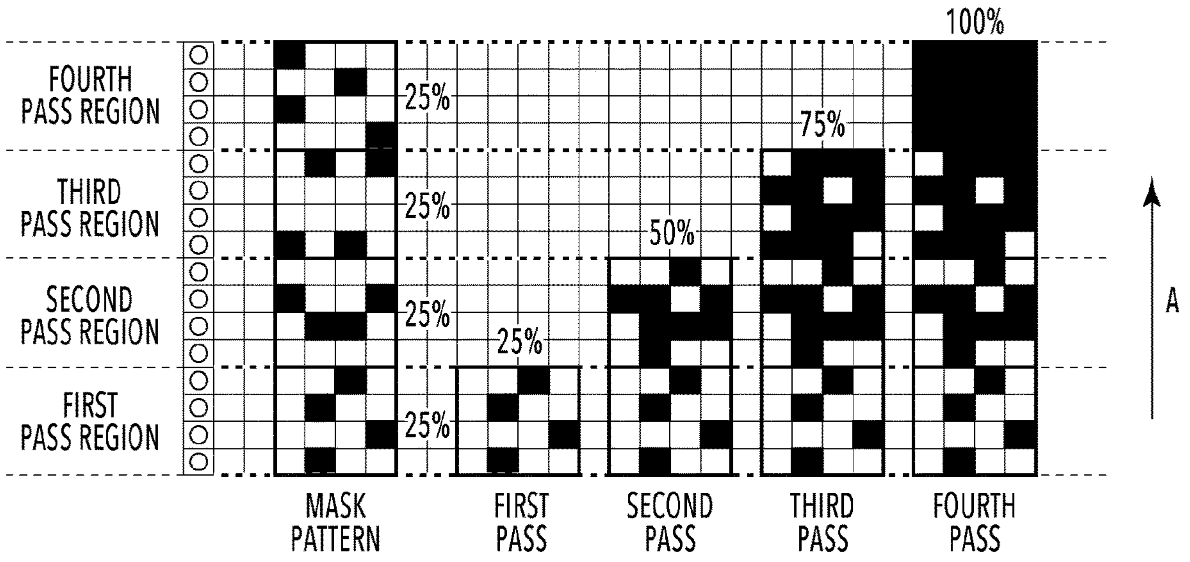

Next, a multi-pass printing method by using a mask pattern according to the embodiment of the present disclosure will be described with reference to FIG. 2B. In order to facilitate the explanation, a description will be given of four-pass printing that defines the number of printing elements to 16 and completing an image by four passes. The printing elements are divided into four printing element groups from a first pass region to a fourth pass region. Each printing element group includes four printing elements. A predetermined mask pattern is set to each pass, and pixels that the respective printing elements can print are blacked out. The mask patterns to be printed by the respective printing element groups have mutually complementary relations, and the entire 4×4 image region can be printed in the case where all of the mask patterns are superposed on one another. First, 25% of the pixels can be printed in the first pass and additional 25% of the pixels can be printed in the second pass. Likewise, 25% of the pixels can be printed in each of the third and fourth passes, whereby 100% of the pixels can be printed in the end. The print medium is transported in a direction of an arrow A in FIG. 2B in an amount of four printing elements each, which is equivalent to a width of the printing element group. In the meantime, actual ejection is carried out based on ejection data created by AND operation of the mask patterns and the print data.

Figure 3:
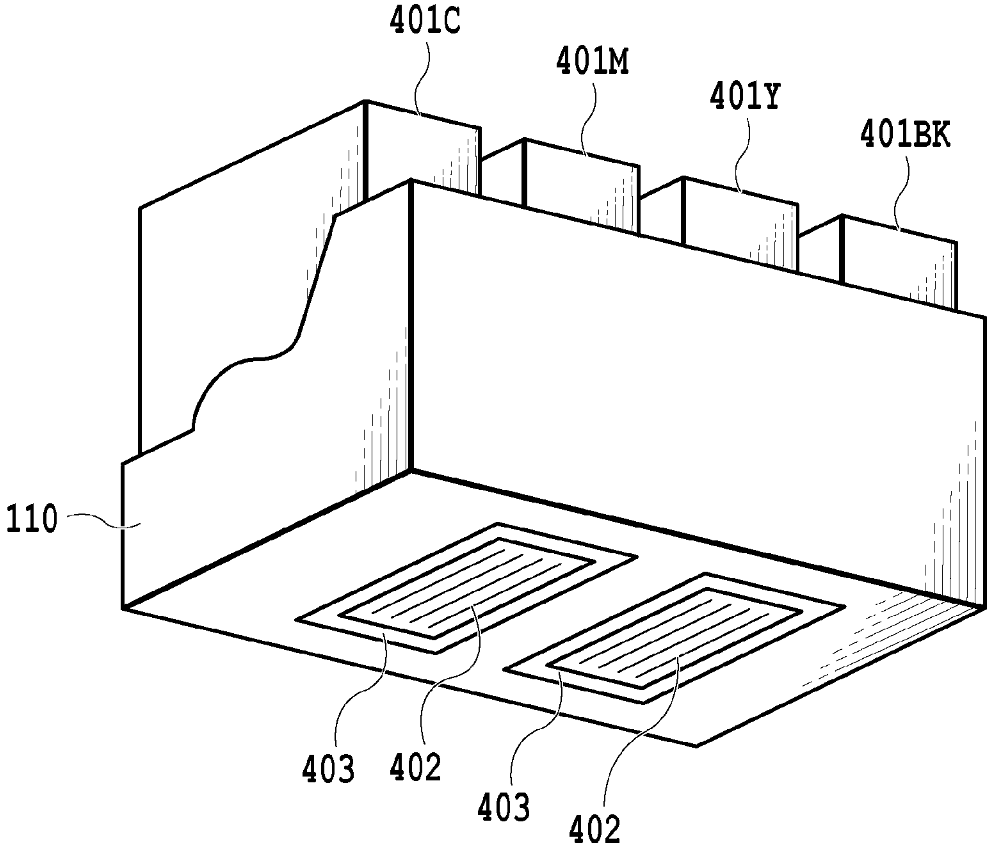
FIG. 3 is a schematic diagram of a print head.

FIG. 3 is a diagram showing a configuration example of the print head 110 and the printing element groups. The print head 110 of the embodiment of the present disclosure includes buffer tanks 401C, 401M, 401Y, and 401BK that are independently provided for inks of four colors of cyan, magenta, yellow, and black. Although the buffer tanks are made visible in FIG. 3 for the sake of explanation, the buffer tanks are supposed to be embedded in the print head. Ink ejection base boards 403 provided with printing element arrays corresponding to the respective inks are disposed at a lower surface of the print head 110. Each ink ejection base board 403 is provided with two printing element arrays each including 1024 printing elements at an interval of 1200 dpi for each color, so that each ink ejection base board can eject the inks of two colors. As shown in FIG. 3, two ink ejection base boards 403 are disposed so as to enable printing of the four colors. Note that the printing elements of each color do not always have to be arranged on the same straight line. Instead, the printing elements may be arranged one by one in a staggered manner, whereby four lines each including 512 printing elements may be arranged at intervals of 600 dpi.

Figure 4:
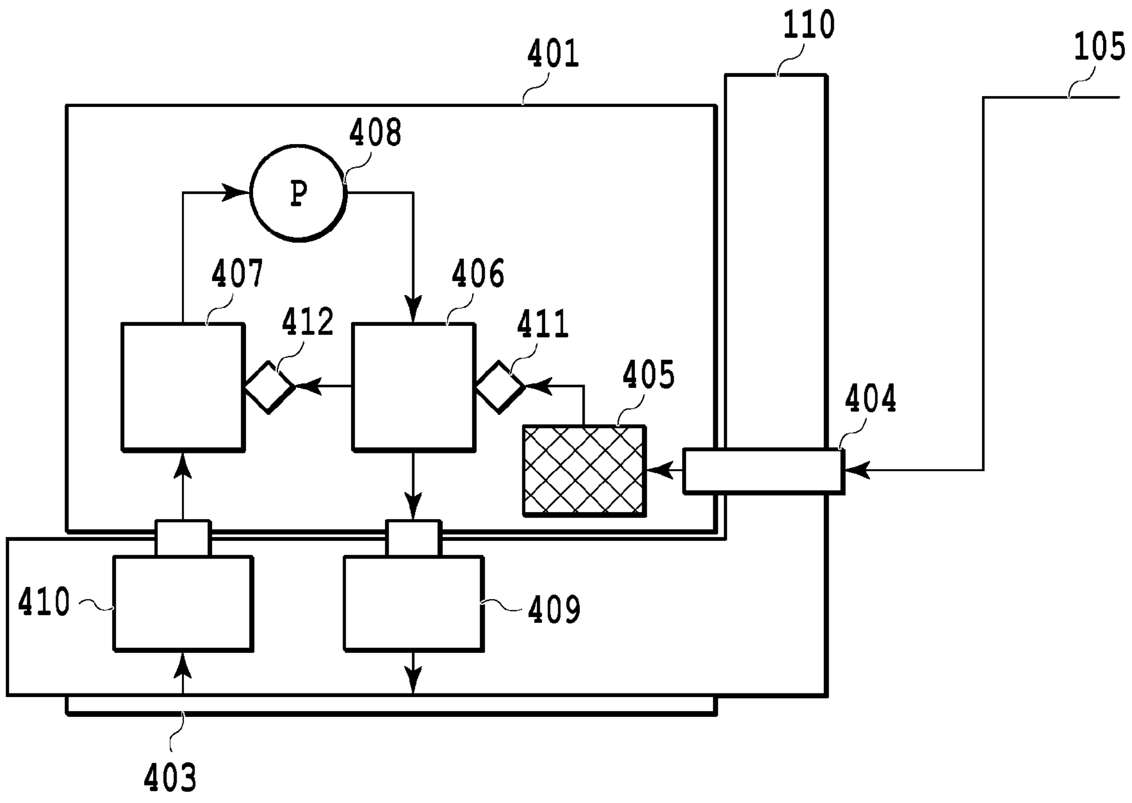
FIG. 4 is a schematic diagram showing a configuration of flow channels in the print head.

FIG. 4 is a diagram schematically showing a configuration of the print head 110 and a buffer tank 401. Although FIG. 4 shows a schematic diagram of flow channels for one color, the buffer tanks and flow channels for the four colors of cyan, magenta, yellow, and black are assumed to be formed in the single print head as mentioned above. The supply tube 105 is passed through the inside of the carriage unit 102 and is coupled to a joint 404 of the print head, thus communicating with the buffer tank 401. The supplied ink passes through a filter 405 and reaches a first pressure chamber 406 through a flow channel in the buffer tank. The first pressure chamber 406 is coupled to a second pressure chamber 407 with a flow channel. Meanwhile, the first pressure chamber 406 is coupled to the second pressure chamber 407 with a different flow channel from the above-mentioned flow channel through the intermediary of a pump 408.

An inlet port of the first pressure chamber 406 is provided with a valve 411 which is opened in a case where a pressure reaches a prescribed negative pressure. An inlet port of the second pressure chamber 407 is provided with a valve 412 which is opened in a case where a pressure reaches a prescribed negative pressure. The inlet port of the first pressure chamber 406 is provided at a flow channel between the first pressure chamber 406 and the filter 405, and the inlet port of the second pressure chamber 407 is provided at the flow channel between the second pressure chamber 407 and the first pressure chamber 406. Meanwhile, the negative pressure to open the valve 412 at the inlet port of the second pressure chamber is set larger than the negative pressure to open the valve 411 at the inlet port of the first pressure chamber.

The ink is supplied from the first pressure chamber 406 to the ink ejection base board 403, more specifically, to supply flow channels (see FIG. 5) of one or more printing element arrays disposed in the ink ejection base board, through the joint 404 and a common supply flow channel 409 provided in the print head. Then, part of the ink supplied to the printing elements is ejected for recovery or printing, and the remaining ink not ejected is returned from collection flow channels (see FIG. 5) in the ink ejection base board to the second pressure chamber 407 through a common collection flow channel 410 provided in the print head.

Figure 5:
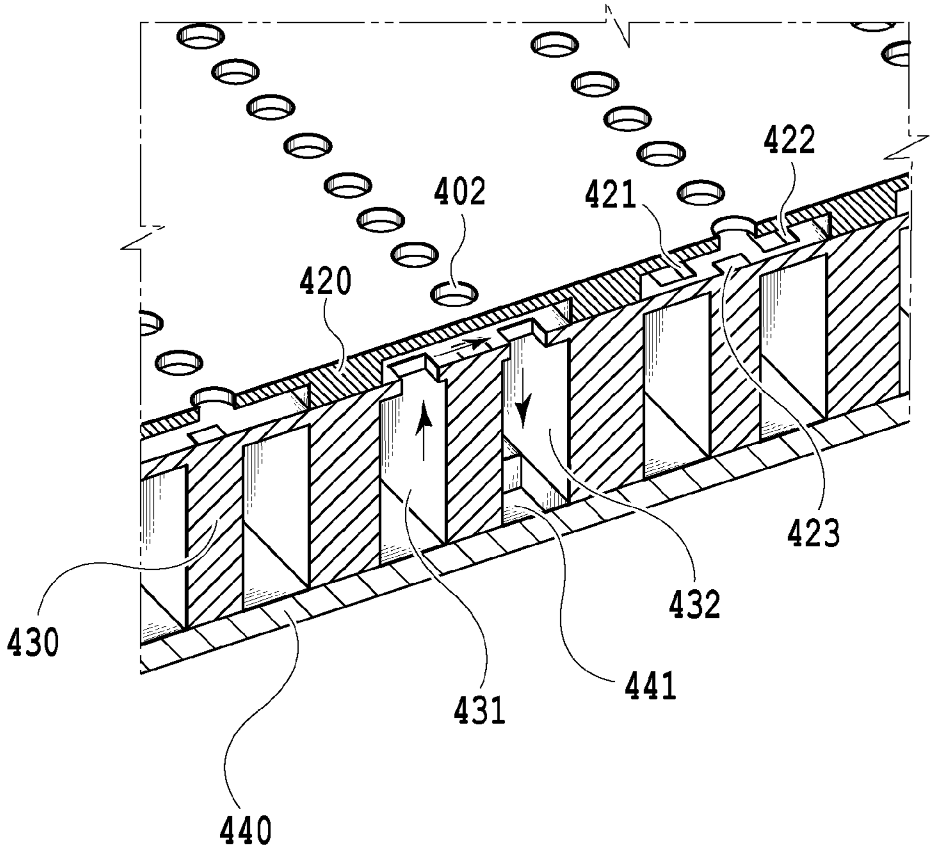
FIG. 5 is a cross-sectional perspective view showing configurations of printing elements and the flow channels in the print head.

FIG. 5 is a view showing configurations of the printing elements and the flow channels formed in the ink ejection base board 403, and flows of the ink therein. Note that FIG. 5 illustrates a surface of the ink ejection base board 403 located on an upper side in order to facilitate the understanding.

Nozzles 402 are formed in an orifice plate 420 on the surface of the ink ejection base board, and printing elements 423 configured to generate thermal energy for ejecting the ink are provided on a printing element board 430. An electrothermal transducer element (a heater) is used for each printing element 423. A bubble is formed in the ink inside each nozzle by using heat generated with the heater, and the ink is ejected from the nozzle 402 by use of the bubble generating energy.

In a state where the ink is supplied, the ink is kept in a state of application of a negative pressure so as to form a meniscus on a nozzle surface. Two flow channels of an inlet port 421 and an outlet port 422 are formed on two sides of each printing element, respectively. In the embodiment of the present disclosure, one inlet port 421 and one outlet port 422 are disposed for each printing element. The inlet port 421 is coupled to a supply flow channel 431 formed in the direction of the printing element array, and the outlet port 422 is coupled to a collection flow channel 432 formed in the direction of the printing element array. The supply flow channel 431 and the collection flow channel 432 are covered with a cover plate 440. The supply flow channel 431 is coupled to the common supply flow channel 409 of the print head depicted in FIG. 4 through openings 441 on the cover plate, and the collection flow channel 432 is coupled to the common collection flow channel 410 depicted in FIG. 4 through an opening 441 on the cover plate. The supply flow channel 431 is provided with two openings 441 and the collection flow channel 432 is provided with one opening 441 in the embodiment of the present disclosure.

Figure 6:
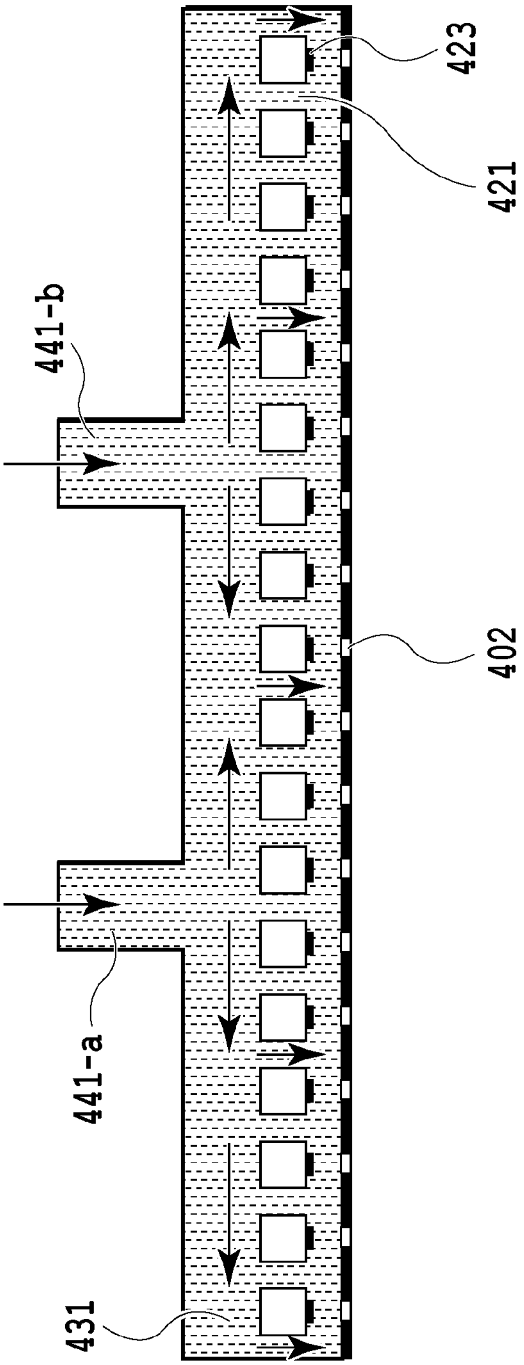
FIG. 6 is a schematic perspective view showing flows of an ink in the print head.

Flows of the ink in the embodiment of the present disclosure will be described below with reference to FIG. 6. FIG. 6 is a schematic perspective view showing the flows of the ink in the print head, which is a view observing a supply flow channel side of the printing element array from sideways. As shown in FIG. 6, an opening 441-*a* and an opening 441-*b* are provided at two locations above the supply flow channel 431 and near the center of the printing element array. The ink is supplied from the common supply flow channel to the supply flow channels 431 through these openings, and then the ink is passed through the supply flow channels 431 and is supplied to the respective printing elements via the inlet ports 421 provided to the respective printing elements. Thereafter, the ink is passed through the outlet ports 422, the collection flow channels 432, and the openings 441 in FIG. 5 is then collected to the common collection flow channel, and is then returned to the common supply flow channel by using a circulation pump.

Figure 7:
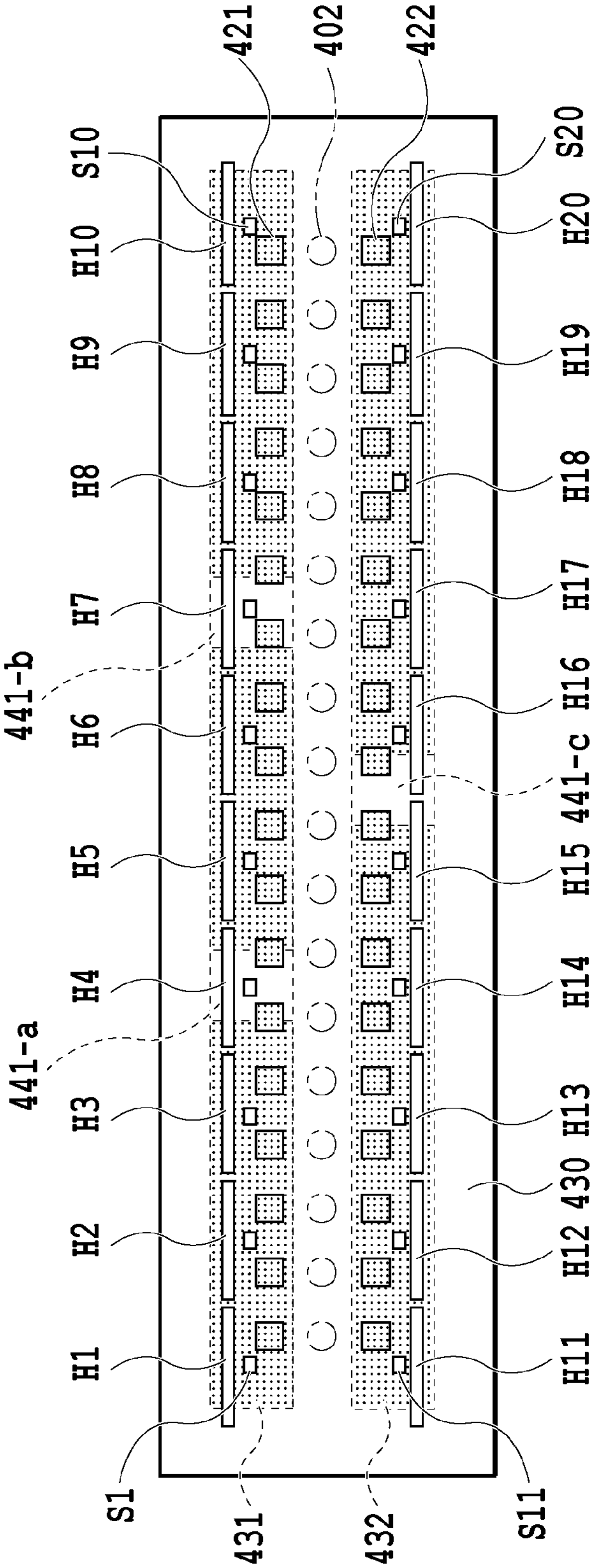
FIG. 7 is a schematic perspective view in a case of observing the print head in a direction of the printing elements.

Next, heating units of the embodiment of the present disclosure will be described with reference to FIG. 7. FIG. 7 is a schematic perspective view showing a layout of heating elements in the print head, which is a view observing the print head in a direction of the printing elements. Heating elements H1 to H10 are disposed on the supply flow channel side of the printing element board 430 along the printing element array, and heating elements H11 to H20 are also disposed on the collection flow channel side likewise. In the following description, the heating elements will be simply referred to as the heating element H in the case of describing the heating elements without distinguishing them from one another.

A driver (not shown) is individually coupled to each of the heating elements H1 to H20. The CPU 302 carries out heating control by turning driving currents to the heating elements H on and off or off and on. In the embodiment of the present disclosure, the heating element located closest to the opening 441-*a* to the supply flow channel 431 is the heating element H4, and the heating element located closest to the opening 441-*b* is the heating element H7. While FIG. 7 shows a mode of disposing the heating elements at ten positions on the supply flow channel side, the number of the heating elements is not limited only to ten pieces, and an arbitrary number of the heating elements may be adopted. However, accuracy of corrective heating to deal with a temperature variation in the direction of the printing element array is deteriorated in the case where the number of the heating elements is small. Accordingly, it is desirable to dispose a reasonable number of the heating elements.

FIG. 8 is a table holding information concerning ON-OFF states corresponding to heating intensities. In the embodiment of the present disclosure, the heating intensity can be adjusted on 21 scales from levels 0 to 20. Meanwhile, in the embodiment of the present disclosure, there is a timing to turn on and off or to turn off and on once in every 4 microseconds or so. As shown in FIG. 8, a ratio between ON state and OFF state is changed depending on the heating intensity. For example, all of the timings are set to the ON state at the heating intensity level 20, or in other words, the heating element is continuously turned on. On the other hand, at the heating intensity level 10, the heating element is turned ON for the first 10 timings and is then turned OFF for the remaining 10 timings. By changing the ratio between the ON state and the OFF state as described above, the heating is carried out at a desired heating intensity. Although the timing to switch between the ON state and the OFF state is set to about 4 microseconds in this case, the timing does not have to be set to 4 microseconds. Similar effects are available by changing an amount of input energy per unit time. Meanwhile, the levels of the heating intensity are not limited only to 21 scales, and it is possible to set the scales to a predetermined number. Although the heating intensity is adjusted by changing the ratio between the ON state and the OFF state in this example, the heating intensity may be adjusted by changing the magnitude of electric power to be applied to the heating element instead.

First Embodiment

A first embodiment will be described below.

Figure 9:
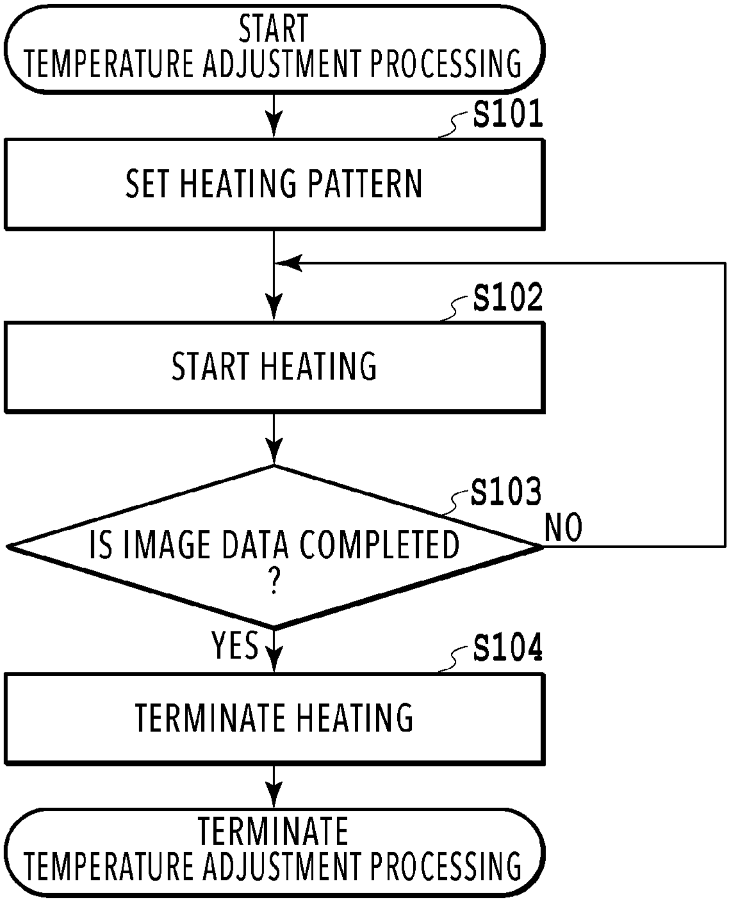
FIG. 9 is a flowchart of temperature adjustment processing.

FIG. 9 is a flowchart of temperature adjustment processing to be executed in parallel with print processing in a case of receiving a print command. The flowchart shown in FIG. 9 is implemented by causing the CPU 302 to execute a program loaded in the memory 303. Here, an ASIC may execute the program instead of the CPU 302, or the ASIC may execute the program in cooperation with the CPU 302.

In the case where image printing is started, the CPU 302 sets a heating pattern in step S101 to begin with. Details of the heating pattern will be described later. In the meantime, the "step Sxxx" will be hereinafter abbreviated as "Sxxx".

In S102, the CPU 302 starts the heating based on the heating pattern set in S101.

In S103, the CPU 302 determines whether or not the image data is completed at the timing of completing one session of a printing operation by causing the print head to perform one scanning operation in a width direction of the print medium. The processing proceeds to S104 in the case where a result of determination in this step turns out to be true. On the other hand, the processing returns to S102 in the case where the result of determination in this step turns out to be false.

In S104, the CPU 302 terminates the heating, thus terminating the temperature adjustment processing.

Figure 10A:
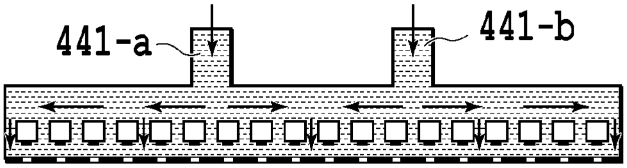
FIGS. 10A to 10C are diagrams for explaining heating temperature distribution to be applied in order to suppress a temperature variation of the ink.

FIG. 10A is a diagram schematically showing flows of the ink in the flow channels on an ink supply side. Meanwhile, FIG. 10B is a graph showing the temperatures of the supplied ink relative to positions of the printing elements in a direction of extension of the printing element array, and FIG. 10C is a graph showing distribution of the heating intensities in the heating control to be carried out in the present embodiment in order to suppress the temperature variation shown in FIG. 10B.

Figure 10B:
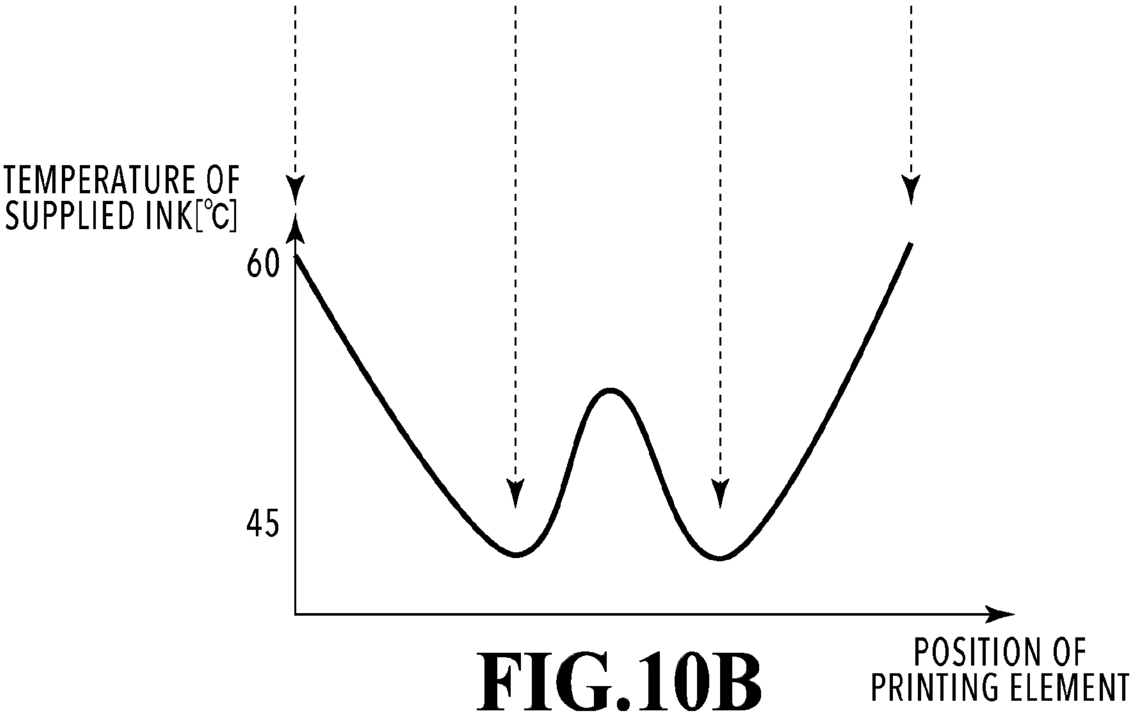
Figure 10C:
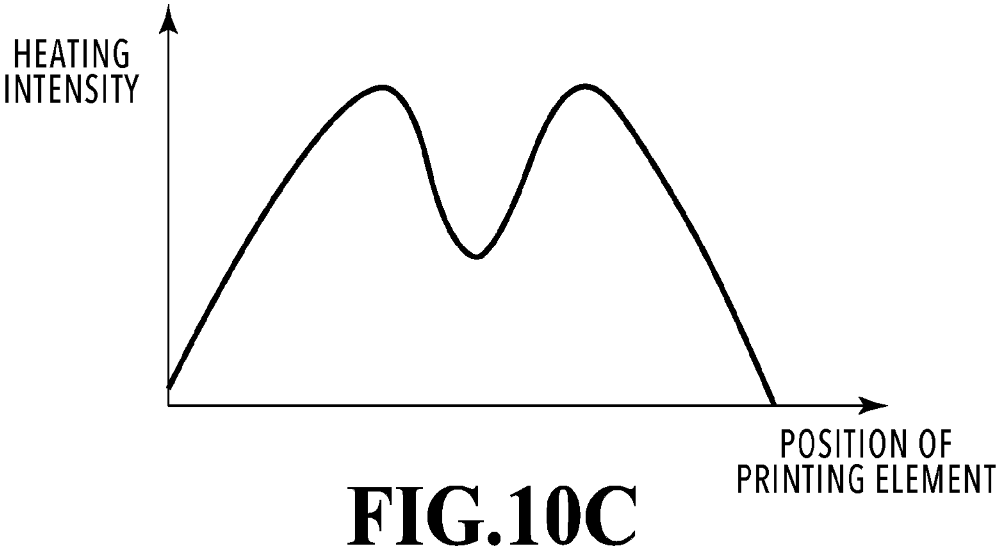

First, with reference to FIGS. 10A and 10B, it is apparent that the temperatures corresponding to the positions of the printing elements near the opening 441-*a* and the opening 441-*b* for the ink supply are low. This is because the ink is supplied to these printing elements without being warmed up. On the other hand, the temperature grows larger as the position comes closer to an end portion of the printing element array. This is because the ink is warmed by the temperature of the print head inside the supply flow channel 431 in the process of supplying the ink to the end portion of the printing element array. Meanwhile, a section between the opening 441-*a* and the opening 441-*b* is formed into a crest waveform while sections of all of the openings are formed into trough waveforms. The temperature distribution in FIG. 10B is the distribution in the case of carrying out the printing under certain printing conditions. This temperature distribution represents a case of printing an image at a duty ratio of 25% on the assumption that printing of an image at an output resolution of 1200 dpi×1200 dpi is defined as a duty ratio of 100%. Distribution plotted in FIG. 10C represents heating intensity distribution corresponding to temperature distribution in the case where the temperature distribution shown in FIG. 10B is obtained under the aforementioned printing conditions. As shown in FIGS. 10B and 10C, the shape of heating intensity distribution has a shape obtained by vertically inverting the shape of the temperature distribution. In the present embodiment, the positions where the temperature of the ink is low are heated in conformity to the temperature in a region where the temperature of the ink is high (near the end portions of the printing element array to be more precise) in order to suppress the temperature variation in the direction of the printing element array.

FIG. 11 is a table holding information on heating intensity levels for the respective heating elements actually arranged in the direction of the printing element array. Among the heating elements H1 to H10, the heating intensity level of each of the heating elements H4 and H7 located near the openings is the highest, which is set to the level 15. In the meantime, the heating intensity level is gradually reduced toward each end portion of the printing element array. Accordingly, the heating elements H3 and H8 are set to the level 10, the heating elements H2 and H9 are set to the level 5, and the heating elements H1 and H10 at the end portions are set to the level 0. Meanwhile, the heating elements H5 and H6 located between the openings are set to the level 5. As described above, the heating intensities corresponding to the respective heating elements in the heating pattern are determined based on positional relations in the direction of the printing element array between the openings and the respective heating elements.

Effect and Other Features of Present Embodiment

As described above, according to the present embodiment, the temperature variation of the supplied ink that may occur depending on the locations of the openings is predicted, and the heating is carried out in accordance with the heating intensity pattern designed to cancel out the predicted temperature variation. Thus, it is possible to suppress the temperature variation of the supplied ink in the direction of the printing element array.

In the present embodiment, the temperature of the supplied ink is assumed to be the highest at the position of the printing element located most distant from the opening, that is, at the position of the printing element located at the end portion of the printing element array. However, the temperature of the supplied ink is also influenced by a heat radiation property depending on the position. For example, depending on the structure of the print head, the heat radiation from the printing element at the end portion of the printing element array to the surroundings becomes larger than that from the printing element located at the center of the printing element array. In this case, the temperature of the supplied ink at the position of the printing element located at the end portion of the printing element array in a combination of a rise in temperature in the flow channel and the heat radiation to the surroundings may become lower than the temperature of the supplied ink at the position of the printing element not located at the end portion of the printing element array. On the other hand, in the case where the heat radiation of the printing element located at the center of the printing element array is small, the temperature of the supplied ink at the position of the relevant printing element may become higher than the temperature of the supplied ink at the position of the printing element located at the end portion of the printing element array. Accordingly, it is possible to obtain a more desirable effect by setting the heating pattern in consideration of the heat radiation property of the print head in addition to the drop in temperature of the supplied ink near the openings.

Moreover, the present embodiment discusses the example of the configuration of the print head in which the openings are provided at the two locations near the center of the printing element array. However, this is not intended to limit the number and the locations of the openings. The temperature distribution of the ink in the supply flow channel also occurs in the case where the locations and the number of the openings are changed. Accordingly, the heating pattern of the entire printing element array may be set based on the concept of increasing the heating intensity in the vicinity of each opening in accordance with the configuration of the print head to be used. In this way, the similar effects can be obtained from any layout configuration of the openings. In the case where there are many openings, it is desirable to increase the number of the heating elements accordingly because the number of waves in the shape of the temperature distribution is also increased.

Moreover, the present embodiment explains the mode of setting the heating intensity levels of the heating elements H1 to H10 installed on the supply flow channel side. Here, it is also possible to heat the heating elements H11 to H20 installed on the collection flow channel side at the same time. In that case, however, it is necessary to adjust the heating intensity levels (to reduce the levels, to be more precise) of the heating elements installed on the supply flow channel side such that the amount of the heat imparted to the ink becomes equal to that in the case of not heating the heating elements installed on the collection flow channel side.

Furthermore, the present embodiment adopts the heating intensity distribution in the shape obtained by inverting the temperature distribution in the direction of the printing element array in the case of printing the image at the duty ratio of 25%. However, in the case of printing an image at a duty ratio lower than the duty ratio of 25%, the temperature of the supplied ink may become the highest at the location of the opening due to excessive heating. For this reason, the heating intensity distribution may possibly be determined based on the temperature distribution at an average duty ratio or at a duty ratio lower than the average ratio. Although the effect may be reduced in that case, the ink is kept from being excessively heated. In this regard, the heating intensity distribution is preferably determined in consideration of a balance between the effect and such an adverse effect.

Second Embodiment

A second embodiment will be described below.

Figure 12:
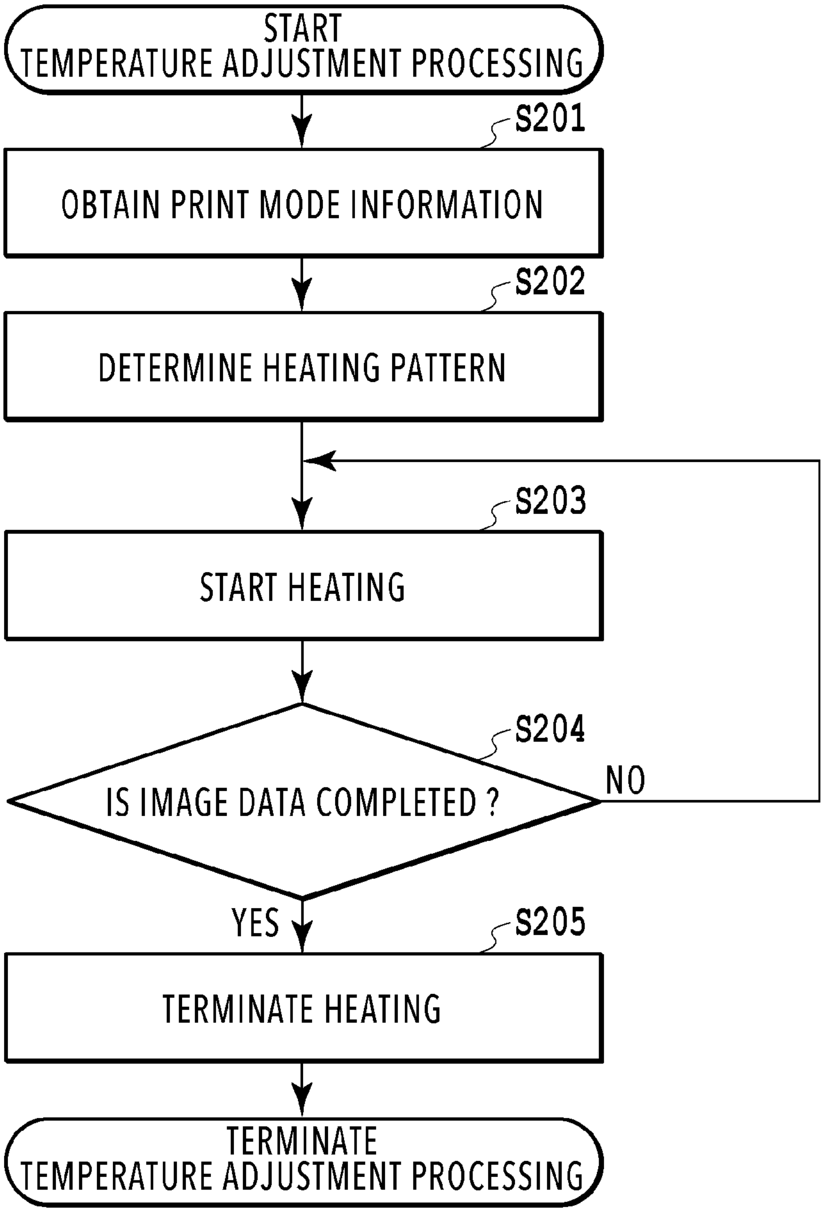
FIG. 12 is a flowchart of the temperature adjustment processing.

FIG. 12 is a flowchart of the temperature adjustment processing in the present embodiment. In the case where image printing is started, the CPU 302 first obtains information (hereinafter referred to as print mode information) that indicates a print mode that is currently set in S201.

In S202, the CPU 302 determines the heating pattern based on the print mode information obtained in S201.

In S203, the CPU 302 starts the heating based on the heating pattern determined in S202.

In S204, the CPU 302 determines whether or not the image data is completed at the timing of completing one session of the printing operation by causing the print head to perform one scanning operation in the width direction of the print medium. The processing proceeds to S205 in the case where a result of determination in this step turns out to be true. On the other hand, the processing returns to S203 in the case where the result of determination in this step turns out to be false.

In S205, the CPU 302 terminates the heating, thus terminating the temperature adjustment processing.

FIG. 13 is a table used in the case of determination of the heating pattern in S202, in which a heating pattern is designed for each of the print modes. As shown in FIG. 13, the print modes are set depending on print quality. The print quality is mainly influenced by the number of passes during the printing (as to how many times the image data is divided and printed). Accordingly, the number of passes varies depending on the print quality. A print mode 1 representing “fast” print quality is a print mode that gives priority to reduction in time while sacrificing the print quality. Here, the printing is carried out in four passes that represent a relatively small number of divisions. A print mode 2 representing “standard” print quality is a print mode to perform printing in general print quality. Here, the printing is carried out in six passes. A print mode 3 representing “fine” print quality is a print mode that gives priority to high print quality. Here, the printing is carried out in twelve passes which are twice as many as the passes in the standard mode. In the present embodiment, a heating pattern A is selected in the print mode 1 representing the “fast” print quality. A heating pattern B is selected in the print mode 2 representing the “standard” print quality. A heating pattern C is selected in the print mode 3 representing the “fine” print quality.

Figure 14A:
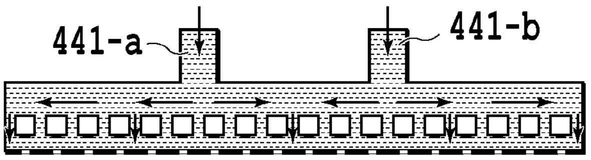
FIGS. 14A to 14C are diagrams for explaining heating intensity distribution to be applied in order to suppress a temperature variation of the ink.
Figure 14B:
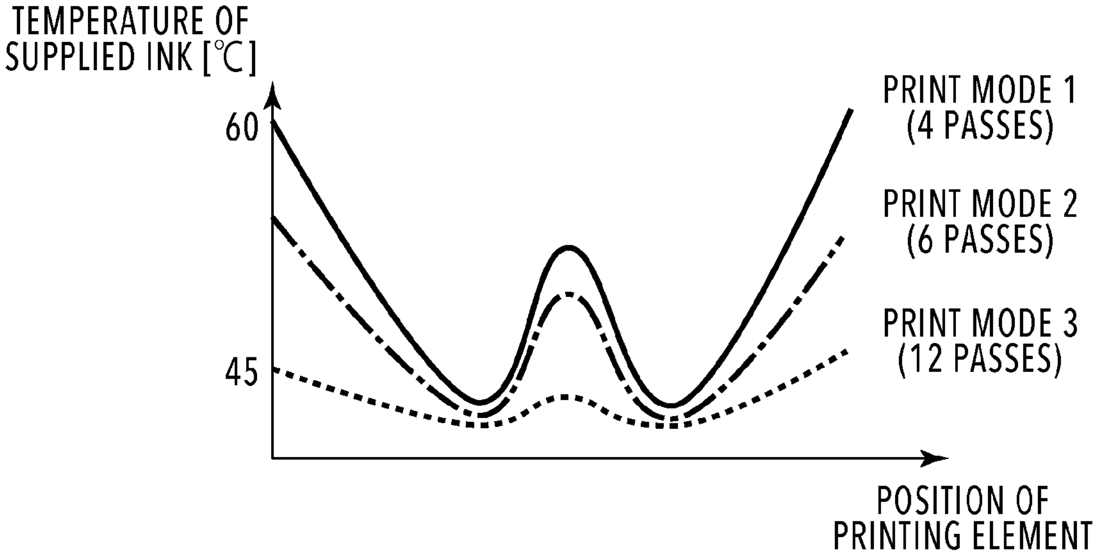
Figure 14C:
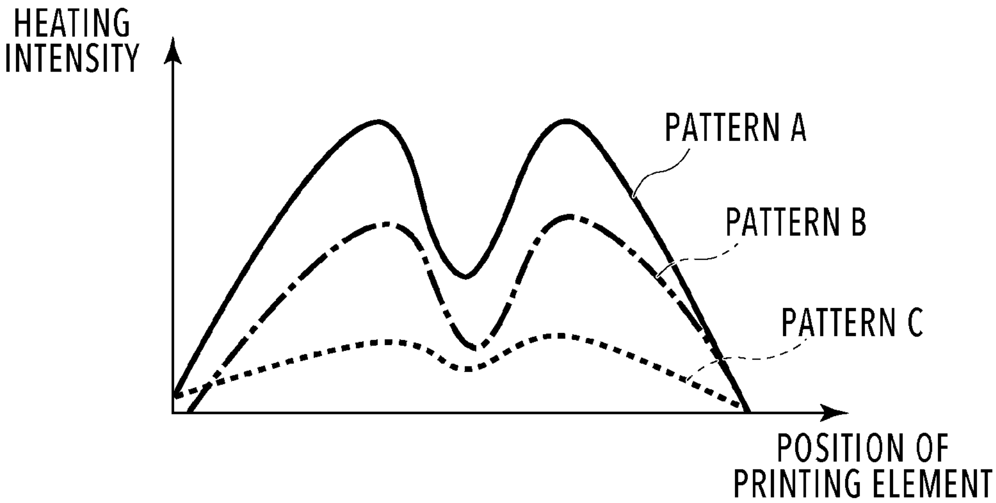

FIG. 14A is a diagram schematically showing flows of the ink in the flow channel on the ink supply side. FIG. 14B is a graph showing the temperatures of the supplied ink relative to the positions of the printing elements in the direction of extension of the printing element array, which are plotted for various print modes. FIG. 14C is a graph showing distribution of the heating intensities in the heating control to be carried out in the present embodiment in order to suppress the temperature variation shown in FIG. 14B. As shown in FIGS. 14B and 14C, overall tendencies of the temperature distribution of the supplied ink and of the distribution of the heating intensities are the same as those of the first embodiment (see FIGS. 10B and 10C).

The smaller the number of passes is, the larger the amount of ink ejection is required for printing in each pass, whereby an amount of rise in temperature grows larger. Accordingly, in the print mode 1 to carry out the printing in four passes, the temperature of the supplied ink is high on the whole, and a temperature difference within the printing element array grows larger. On the other hand, in the print mode 3 to carry out the printing in twelve passes, the temperature of the supplied ink is low on the whole, and the temperature difference within the printing element array is kept small. The distribution curves shown in FIG. 14C represent a variety of distribution of the heating intensities in order to deal with the temperature variations in the direction of the printing element array as mentioned above, and each distribution curve is formed into a shape obtained by vertically inverting the shape of the corresponding temperature distribution shown in FIG. 14B. Here, the positions where the temperature of the ink is low are heated in conformity to the end portions of the printing element array where the temperature of the supplied ink is high in order to suppress the temperature variation in the direction of extension of the printing element array.

FIG. 15 is a table holding information on heating intensity levels for the respective heating elements to be actually arranged in the direction of the printing element array. Note that the heating conditions regarding the heating intensity levels are shown in FIG. 8.

As shown in FIG. 15, every heating pattern has the same tendency. Specifically, the heating elements H1 and H10 located near the printing elements at the end portions of the printing element array do not perform heating, whereas the heating elements H4 and H7 located near the openings to supply the ink perform the strongest heating. Moreover, as shown in FIG. 14C, the heating intensity is high in the heating pattern A corresponding to the print mode involving the small number of passes, while the heating intensity is low in the heating pattern C corresponding to the print mode involving the large number of passes. The heating intensity in the heating pattern B has a value intermediate between the value in the heating pattern A and the value in the heating pattern C.

Effect and Other Features of Present Embodiment

As described above, the temperature distribution of the supplied ink in the direction of the printing element array is predetermined to some extent depending on the print mode. It is therefore possible to suppress the temperature variation in the direction of the printing element array more accurately by selecting the optimum heating pattern depending on the print mode and performing the heating accordingly as described in the present embodiment.

The example of increasing the heating intensity more as the number of passes is less has been described above. However, the present embodiment is not limited only to this configuration. For example, unevenness in density may be emphasized in the case where a cycle of unevenness in density attributed to the temperature distribution synchronizes with a feeding cycle of the print medium at a point of completion of the printing as a consequence of repeating the passes. In this case, it is necessary to increase the heating intensities even in the print mode with the large number of passes. On the other hand, the heating intensity may be decreased even in the print mode with the small number of passes on the condition that the unevenness in density is reduced as a consequence of dispersion of the cycle of unevenness in density and the feeding cycle of the print medium.

As described above, the heating pattern is preferably set individually based on the print mode being set up.

Third Embodiment

A third embodiment will be described below.

Figures 16A, 16B:
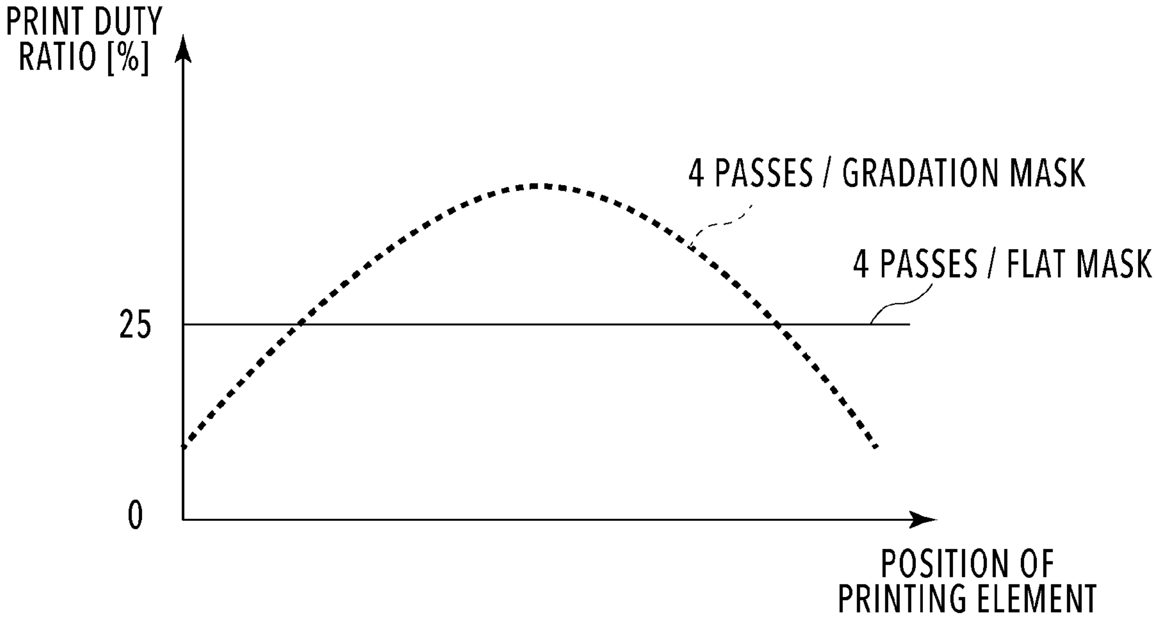
FIGS. 16A and 16B are tables holding information on heating patterns for respective print modes.

FIG. 16A is a table showing correlations between the print mode and the heating pattern in the present embodiment. FIG. 16B is a graph showing print duty ratios regarding respective masks in order to explain mask shapes. The present embodiment sets up the print modes by using masks having different shapes in mask processing for dividing the image data into the passes. This configuration is designed because unevenness in density in the printing element array, unevenness in the form of stripes that may occur at end portions of the printing element array, or the like in a printed image varies depending on the shapes of masks under specific printing conditions.

Here, a print mode 1 in which the number of passes is set to four passes and the mask has a "flat" shape and a print mode 4 in which the number of passes is set to the same four passes but the mask has a "gradation" shape that is gradually changed in the direction of the printing element array will be described as examples. The heating pattern is changed by the mask shape, and the print mode 1 is set to a heating pattern A while the print mode 4 is set to a heating pattern D. FIG. 16B shows print duty ratios of the respective masks. The mask in the flat shape has a constant duty ratio of 25% without distribution in the direction of the printing element array. This mask is used for printing for 100% by repeating image printing at the duty ratio of 25% four times. On the other hand, as shown in FIG. 16B, the mask in the gradation shape is configured to reduce the duty ratios of the printing elements at the end portions of the printing element array while increasing the duty ratios of the printing elements at the center in the printing element array so as to compensate for the reduction, thus achieving 100% after the complementing with the four passes. This shape exerts an advantageous effect in a case where the end portions of the printing element array are apt to develop unevenness in the form of stripes.

Figure 17A:
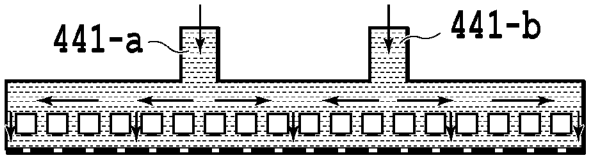
FIGS. 17A to 17C are diagrams for explaining heating intensity distribution to be applied in order to suppress a temperature variation of the ink.
Figure 17B:
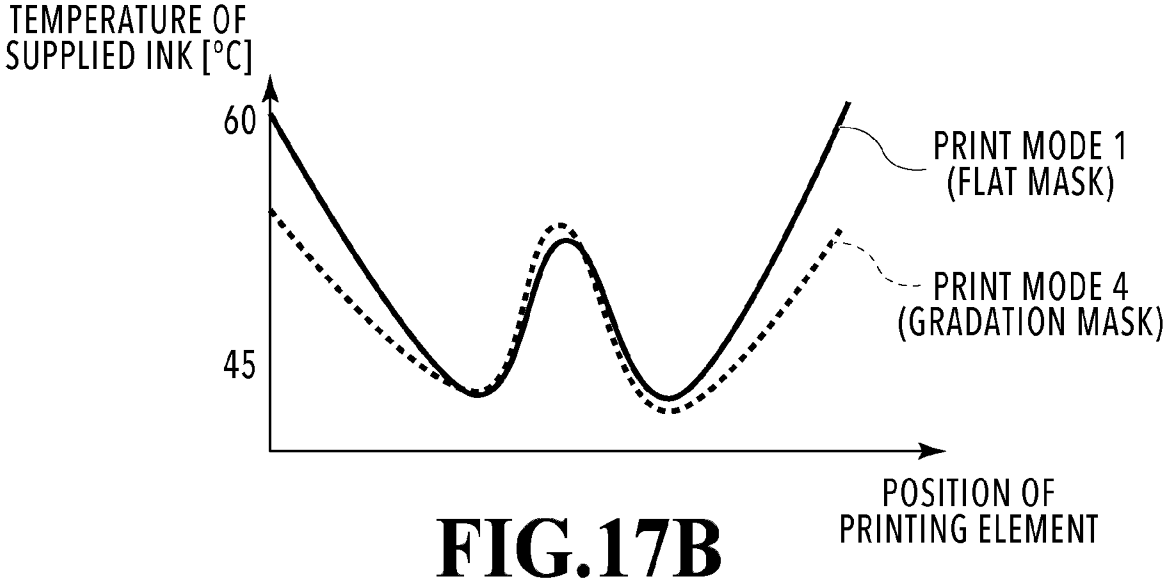
Figure 17C:
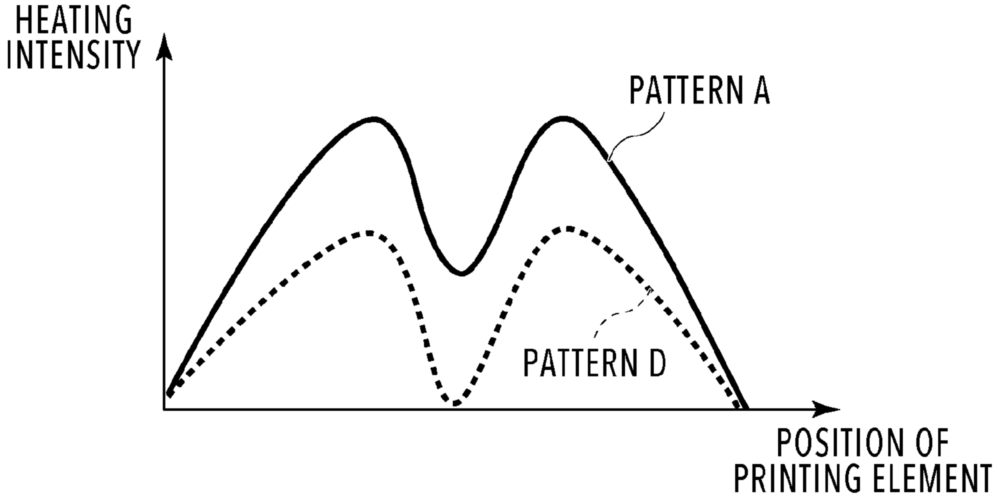

FIG. 17A is a diagram schematically showing flows of the ink in the flow channel on the ink supply side. FIG. 17B is a graph showing the temperatures of the supplied ink relative to the positions of the printing elements in the direction of extension of the printing element array, which are plotted for various print modes (that is, for respective mask shapes used in the printing). FIG. 17C is a graph showing distribution of the heating intensities in the heating control to be carried out in the present embodiment in order to suppress the temperature variations shown in FIG. 17B. As shown in FIGS. 17B and 17C, overall tendencies of the temperature distribution of the supplied ink and of the distribution of the heating intensities are the same as those of the first embodiment.

As shown in FIG. 17B, in contrast to the print mode 1 using the flat mask, the temperature is less likely to rise in the print mode 4 using the gradation mask due to the low print duty ratios of the printing elements at the end portions of the printing element array, and the temperature is therefore lower than that in the print mode 1. On the other hand, in the print mode 4, the temperature in the vicinity of the center in the direction of the printing element array becomes slightly higher than that in the print mode 1 due to the high print duty ratio of the printing element in the vicinity of the center as a consequence of the reduction in print duty ratio of the printing elements at the end portions of the printing element array. The distribution curves shown in FIG. 17C represent a variety of distribution of the heating intensities in order to deal with the above-described temperature distribution, and each distribution curve is formed into a shape obtained by vertically inverting the shape of the corresponding temperature distribution shown in FIG. 17B.

FIG. 18 is a table holding information on heating intensity levels for the respective heating elements to be actually arranged in the direction of the printing element array. Note that the heating conditions regarding the heating intensity levels are shown in FIG. 8. As shown in FIG. 18, in the heating pattern D using the gradation mask, the heating intensities of the heating elements H4 and H7 located near the openings are lower than those in the heating pattern A using the flat mask due to the lower temperatures of the supplied ink near the printing elements at the end portions of the printing element array.

Effect of Present Embodiment

Since the temperature distribution of the supplied ink in the direction of the printing element array varies depending on the mask shape, it is possible to suppress the temperature variation in the direction of the printing element array more accurately by selecting the optimum heating pattern depending on the mask used in the print mode and performing the heating accordingly as described in the present embodiment.

Fourth Embodiment

A fourth embodiment will be described below.

FIG. 19 is a table showing correlations between the print mode and the heating pattern in the present embodiment. The present embodiment sets up print modes having different scanning speeds of a carriage (hereinafter referred to as a CR) that mounts the print head. A print mode having an increased CR speed is selected in the case of carrying out the printing faster. To be more precise, a print mode 1 representing a fast mode is set to a pattern A and a print mode 5 representing the fastest mode is set to a pattern G.

Figure 20A:
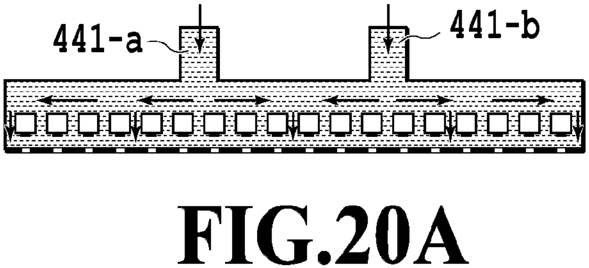
FIGS. 20A to 20C are diagrams for explaining heating intensity distribution to be applied in order to suppress a temperature variation of the ink.
Figure 20B:
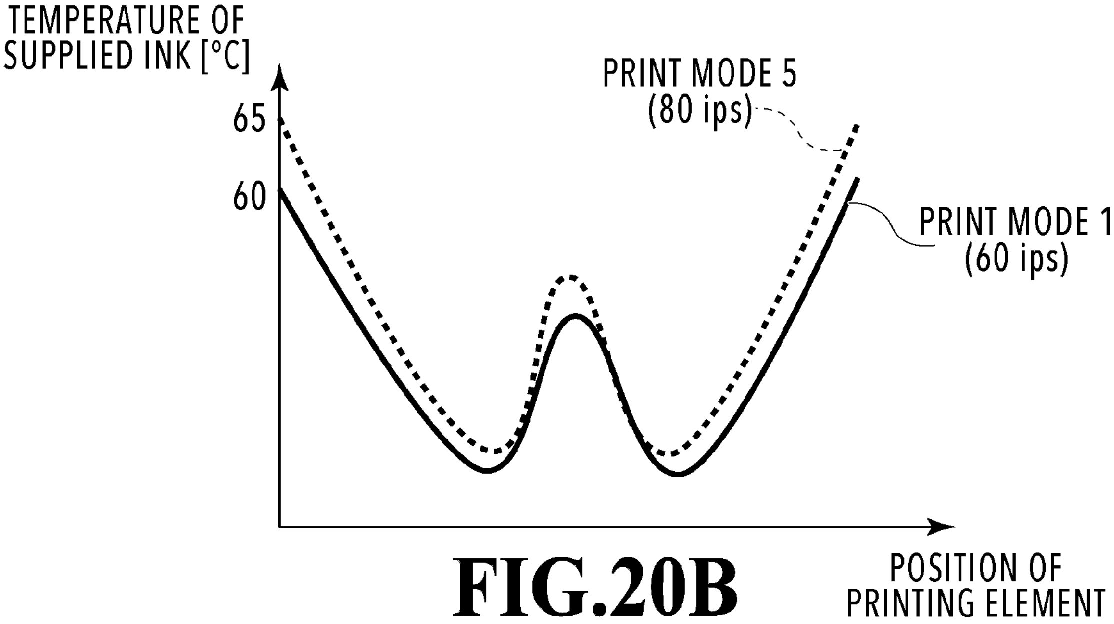
Figure 20C:
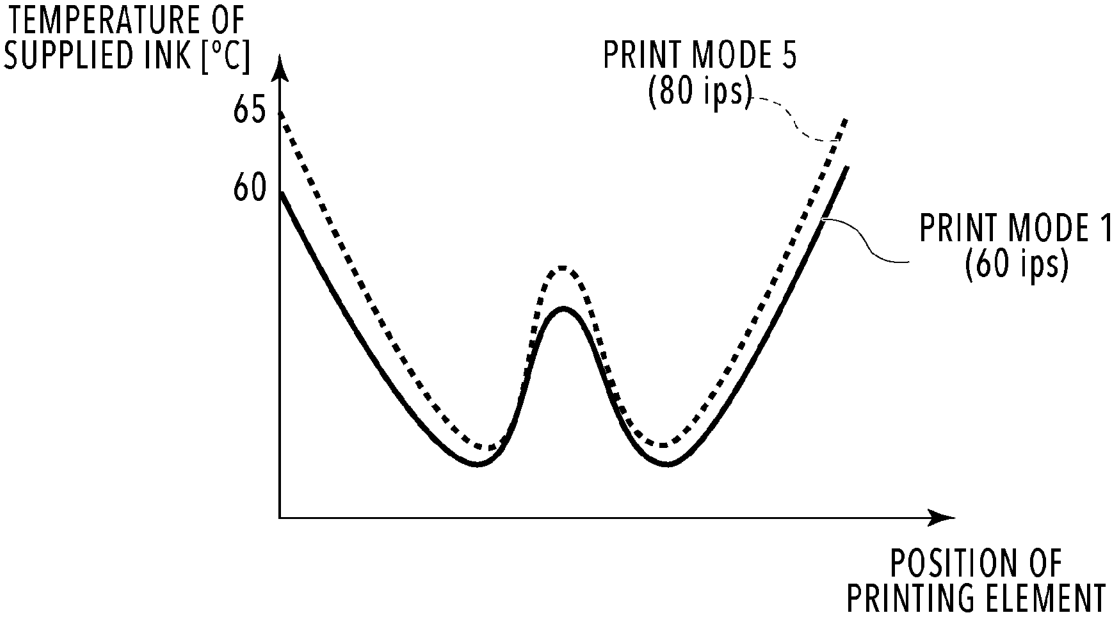

FIG. 20A is a diagram schematically showing flows of the ink in the flow channel on the ink supply side. FIG. 20B is a graph showing the temperatures of the supplied ink relative to the positions of the printing elements in the direction of extension of the printing element array, which are plotted for various print modes (that is, for respective CR speeds during the printing). FIG. 20C is a graph showing distribution of the heating intensities in the heating control to be carried out in the present embodiment in order to suppress the temperature variations shown in FIG. 20B. As shown in FIGS. 20B and 20C, overall tendencies of the temperature distribution of the supplied ink and of the distribution of the heating intensities are the same as those of the first embodiment.

In the print mode 5 at the CR speed of 80 ips, the temperature is slightly increased on the whole in comparison with the temperature in the print mode 1 at the CR speed of 60 ips. The distribution curves shown in FIG. 20C represent a variety of distribution of the heating intensities in order to deal with the above-described temperature distribution, and each distribution curve is formed into a shape obtained by vertically inverting the shape of the corresponding temperature distribution shown in FIG. 20B.

FIG. 21 is a table holding information on heating intensity levels for the respective heating elements to be actually arranged in the direction of the printing element array. Note that the heating conditions regarding the heating intensity levels are shown in FIG. 8. As shown in FIG. 21, in the heating pattern G at the fast CR speed, the heating intensities of are large on the whole.

Effect of Present Embodiment

Since the temperature distribution of the supplied ink in the direction of the printing element array varies depending on the CR speed, it is possible to suppress the temperature variation in the direction of the printing element array more accurately by selecting the optimum heating pattern depending on the CR speed in the print mode and performing the heating accordingly as described in the present embodiment.

Fifth Embodiment

A fifth embodiment will be described below.

FIG. 22A is a table showing correlations between the print mode and the heating pattern in the present embodiment. FIG. 22B is a table holding information on heating intensity levels for the respective heating elements to be actually arranged in the direction of the printing element array. As shown in FIGS. 22A and 22B, in the present embodiment, the heating pattern in changed depending on the print medium even in the case of the same printing conditions.

In the example shown in FIGS. 22A and 22B, a heating pattern A corresponds to a polyvinyl chloride-based medium (PVC-based medium) on which image unevenness is conspicuous while a heating pattern H corresponds to a fabric-based medium on which image unevenness is inconspicuous. Among the print media, there is a medium on which a difference between a designed amount of ink droplets and an actual amount of ink ejection is less recognizable as the image unevenness even in the case where such a difference occurs due to the temperature difference of the supplied ink. On such a medium, there is no problem to reduce suppression of the temperature difference of the supplied ink a little. Accordingly, the fabric-based medium on which the image unevenness is inconspicuous is set to the heating intensities at low levels on the whole as shown in FIG. 22B.

Effect of Present Embodiment

The present embodiment enables the heating control tailored to the print medium.

Sixth Embodiment

A sixth embodiment will be described below. In the present embodiment, the heating pattern is determined based on a temperature difference between the supplied ink and the print head as well as on the print mode.

Figure 23A:
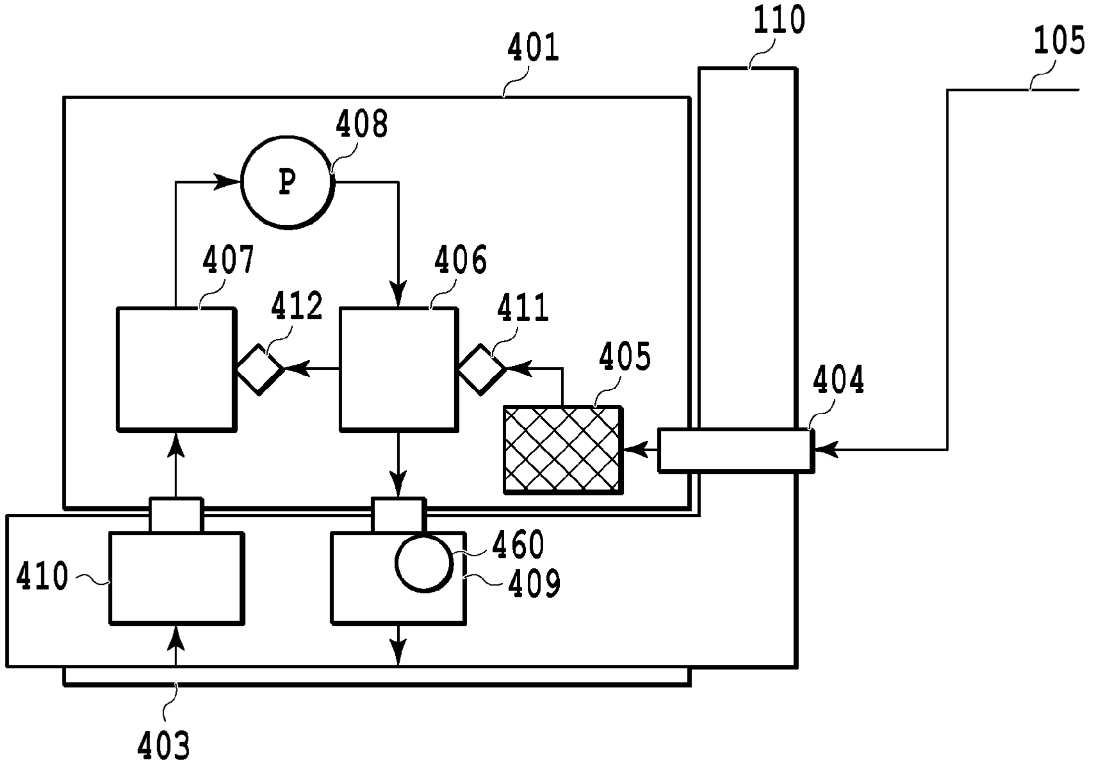
FIGS. 23A and 23B are schematic diagrams of a print head showing layouts of a sensor for measuring a temperature of the ink and sensors for measuring a temperature of the print head.
Figure 23B:
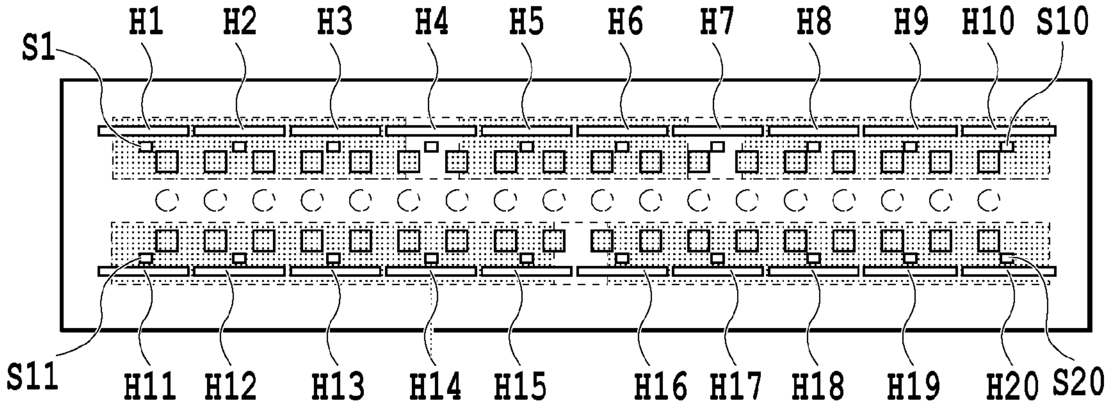

FIG. 23A shows an example of temperature measurement of the supplied ink obtained as ink temperature information, and FIG. 23B shows an example of temperature measurement of the print head. As shown in FIG. 23A, the temperature of the supplied ink is measured by installing a temperature sensor on the supply side in the circulation flow channels, which is located at part of the common supply flow channel 409 in the present embodiment. On the other hand, as shown in FIG. 23B, temperature sensors are installed near the respective heating elements of the print head. The heating elements H1 to H20 correspond to temperature sensors S1 to S20, respectively. In the present embodiment, all of values of temperatures are obtained from the respective temperature sensors S1 to S20, and an average value thereof is treated as the temperature of the print head.

Figure 24:
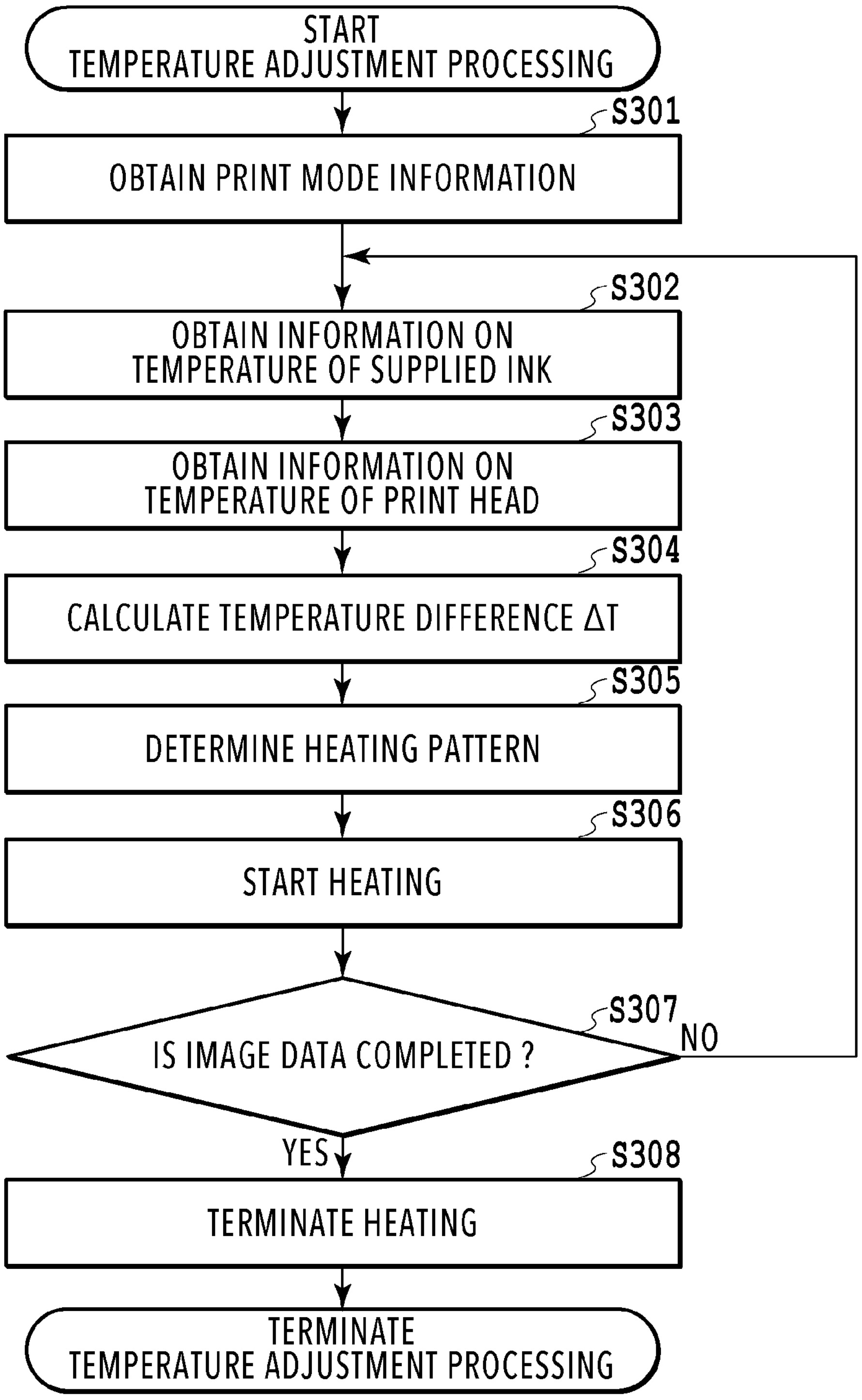
FIG. 24 is a flowchart of temperature adjustment processing.

FIG. 24 is a flowchart of the temperature adjustment processing in the present embodiment. In the case where the image printing is started, the CPU 302 obtains the print mode information in S301 to begin with.

In S302, the CPU 302 obtains information on the temperature of the supplied ink.

In S303, the CPU 302 obtains information on the temperature of the print head.

In S304, the CPU 302 calculates a difference between the temperature of the supplied ink and the temperature of the print head as a temperature difference ΔT by using the information on the temperature of the supplied ink obtained in S302 and the information on the temperature of the print head obtained in S303.

In S305, the CPU 302 determines the heating pattern based on the temperature difference ΔT calculated in S304 and the print mode information obtained in S301.

In S306, the CPU 302 starts the heating based on the heating pattern determined in S305.

In S307, the CPU 302 determines whether or not the image data is completed at the timing of completing one session of the printing operation by causing the print head to perform one scanning operation in the width direction of the print medium. The processing proceeds to S308 in the case where a result of determination in this step turns out to be true. On the other hand, the processing returns to S302 in the case where the result of determination in this step turns out to be false.

In S308, the CPU 302 terminates the heating, thus terminating the temperature adjustment processing.

FIG. 25A is a table used for determination of the heating pattern in S305, in which the heating pattern is designated depending on the temperature difference. As shown in FIG. 25A, the heating pattern is changed depending on the temperature difference even in the case of the same print mode. This example extracts relations in the print mode 1 only. In reality, however, similar settings are also made for print modes other than the print mode 1. FIG. 25B is a table holding information on heating intensity levels for the respective heating elements to be actually arranged in the direction of the printing element array for the respective heating patterns. Note that the heating conditions regarding the heating intensity levels are shown in FIG. 8. The larger the temperature difference between the supplied ink and the print head is, the temperature variation of the ink in the direction of the printing element array grows larger. Accordingly, the higher heating intensity is set to the heating pattern having the larger temperature difference.

Effect and Other Features of Present Embodiment

As described above, according to the present embodiment, it is possible to suppress the temperature variation in the direction of the printing element array more accurately by changing the heating pattern based on the temperature difference between the supplied ink and the print head.

According to the above description, the heating pattern is determined based on the temperature difference between the supplied ink and the print head. However, it is also possible to obtain the effect of the present embodiment by determining the heating pattern based solely on the temperature of the supplied ink. In this instance, a temperature inside the printing apparatus in the vicinity of the print head may be measured as information on the temperature inside the printing apparatus and the measured temperature may be used as the temperature of the supplied ink. Alternatively, a temperature of an environment where the printing apparatus is installed and the temperature of the print head may be used in combination. Meanwhile, according to the above description, the average value of the values obtained with the temperature sensors S1 to S20 is used as the temperature of the print head. For example, an average value of the values obtained with the temperature sensor S4 and the sensor S7 located near the openings may be used instead, or a measurement value with a certain one of the sensors may be used instead.

Seventh Embodiment

A seventh embodiment will be described below.

Figure 26A:
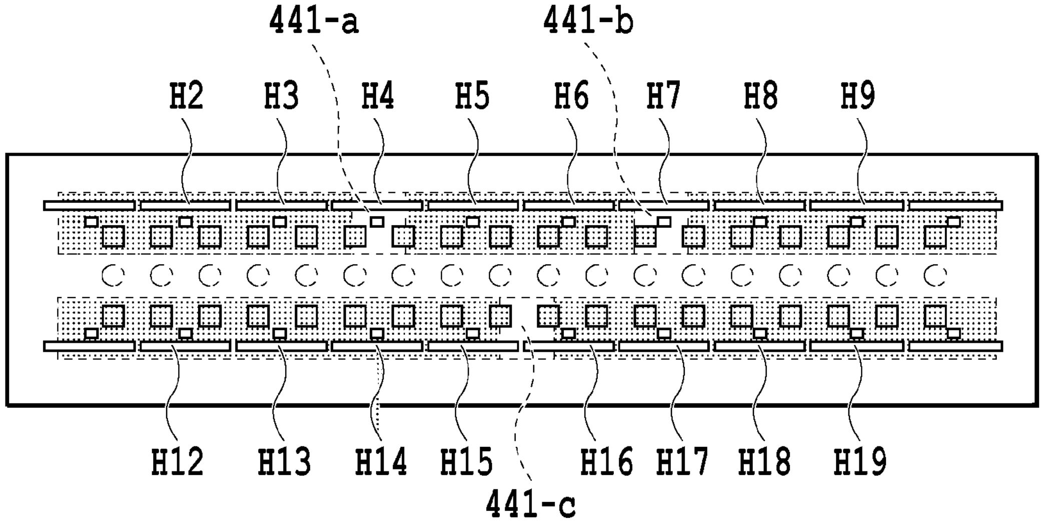
FIGS. 26A and 26B are schematic perspective views of print heads showing locations of openings, which are observed in a direction of printing elements.
Figure 26B:
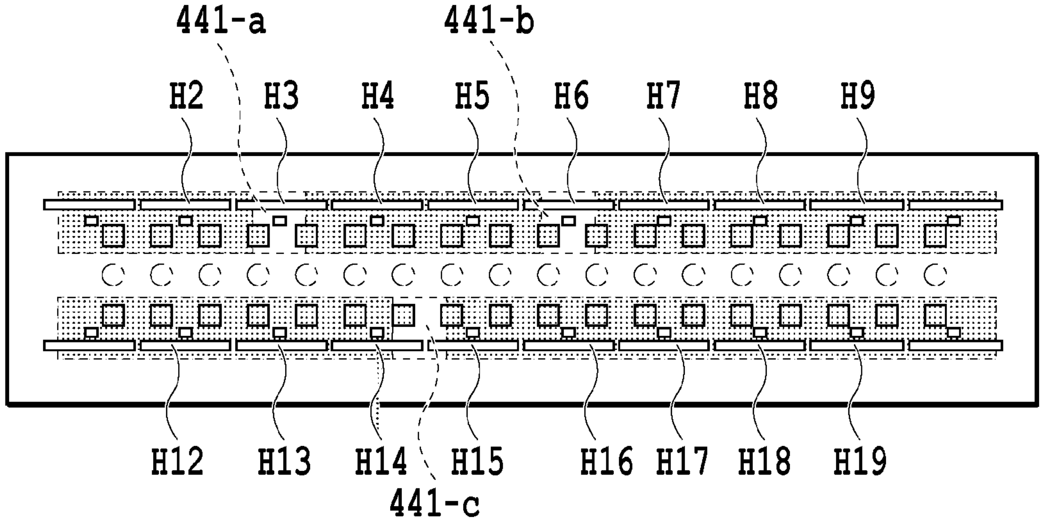

FIGS. 26A and 26B show a configuration example of a print head in which locations of the openings to supply the ink are different from those in the above-described embodiments. Specifically, FIG. 26A shows the same configuration of the printing element arrays as that in the first to sixth embodiments. Meanwhile, FIG. 26B shows a configuration in which locations of the openings 441-*a* and 441-*b* are shifted. To be more precise, the heaters H4 and H7 are the heaters located near the opening 441-*a* and 441-*b* in FIG. 26A, whereas the heaters H3 and H6 are the heaters located near the opening 441-*a* and 441-*b* in FIG. 26B.

In the print head, a first printing element array and a second printing element array are arranged adjacent to each other, and these printing element arrays are arranged close to each other in order to reduce the size of the print head. Here, due to the requirements of the flow channel configuration, the locations of the openings may be changed depending on the printing element array as shown in FIG. 26B. The temperature distribution in the direction of the printing element array is also changed by the different locations of the openings. It is therefore necessary to modify the heating pattern in order to correct for this change.

FIGS. 27A and 27B are tables holding information on heating intensity levels for the respective heating elements to be actually arranged in the direction of the printing element array regarding the respective patterns in FIGS. 26A and 26B. FIG. 27A corresponds to FIG. 26A while FIG. 27B corresponds to FIG. 26B. As shown in FIG. 27B, the heating intensities of the heaters H3 and H7 located near the openings are higher in the pattern of FIG. 26B.

Effect of Present Embodiment

As described above, it is possible to suppress the temperature variation in the direction of the printing element array more accurately by modifying the heating pattern depending on the locations of the openings.

Eighth Embodiment

An eighth embodiment will be described below.

In the present embodiment, the heating is carried out after correcting the heating pattern depending on an image duty ratio. The image duty ratio is information on density of an image. For example, a density equivalent to printing with one-dot ink droplets in a 1200 dpi×1200 dpi area will be defined as a duty ratio of 100%. The lower the density of the image is, the ratio becomes smaller. Since the temperature distribution in the direction of the printing element array varies with the image duty ratio, the heating pattern is corrected accordingly in the present embodiment.

Figure 28:
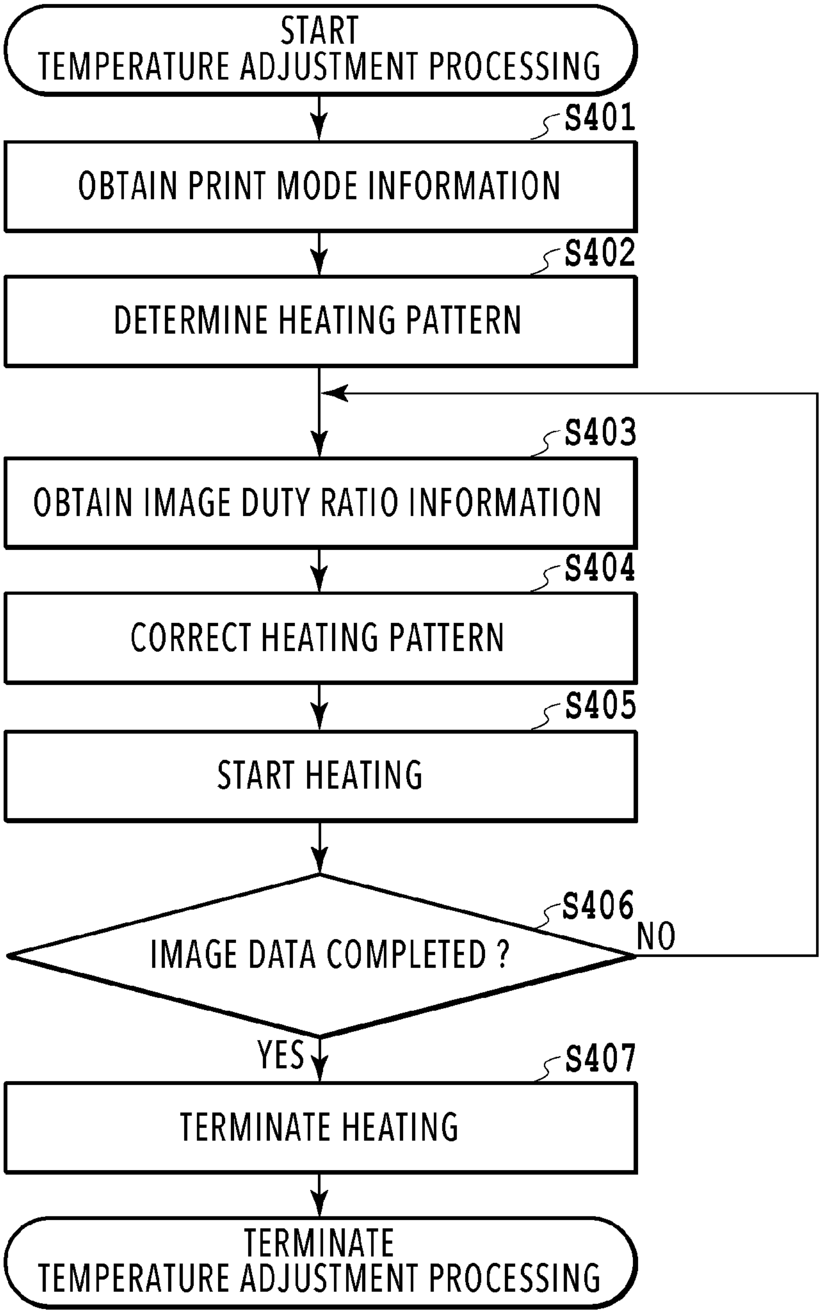
FIG. 28 is a flowchart of an image printing operation.

FIG. 28 is a flowchart of an operation concerning image printing in the present embodiment. In the case where the image printing is started, the CPU 302 obtains the print mode information in S401 to begin with.

In S402, the CPU 302 determines the heating pattern based on the print mode information obtained in S401.

In S403, the CPU 302 obtains image duty ratio information.

In S404, the CPU 302 subjects the heating pattern to heating intensity correction by using the image duty ratio information obtained in S403 and using a correction efficient predetermined for each image duty ratio.

In S405, the CPU 302 starts the heating based on the corrected heating pattern.

In S406, the CPU 302 determines whether or not the image data is completed at the timing of completing one session of the printing operation by causing the print head to perform one scanning operation in the width direction of the print medium. The processing proceeds to S407 in the case where a result of determination in this step turns out to be true. On the other hand, the processing returns to S403 in the case where the result of determination in this step turns out to be false.

In S407, the CPU 302 terminates the heating, thus terminating the image printing.

FIG. 29A is a table holding information on correction coefficients used for correcting the heating patterns, which holds the correction coefficients for the respective image duty ratios. FIG. 29B is a table showing examples of results of correction carried out based on the image duty ratios using the table in FIG. 29A. This table shows a case where the image duty ratio is in a range from 81% to 100% and a case where the image duty ratio is in a range from 21% to 40%. In the present embodiment, an average value among all of the printing elements in a printing area corresponding to one scanning operation is defined as the image duty ratio.

As shown in FIG. 29B, the coefficient is equal to 1.0 in the case of the high image duty ratio in the range from 81% to 100%, and the heating pattern is therefore unchanged. On the other hand, in the case where the image duty ratio is equal to 30%, for example, the correction coefficient becomes 0.4 and the heating pattern is corrected by multiplying the heating intensity level by the correction coefficient. In the case where the value after the correction is a decimal, decimal places may be rounded off.

Effect and Other Features of Present Embodiment

As described above, it is possible to suppress the temperature variation in the direction of the printing element array more accurately by correcting the heating pattern based on the image duty ratio.

In the above description, the correction coefficient is used in common regardless of the positions of the printing elements. Instead, it is possible to suppress the temperature variation more accurately by changing the correction coefficient depending on the position of the printing element in consideration of the heat radiation property and the like.

Moreover, in the above description, the correction is carried out by obtaining the image duty value information in each scanning operation. Instead, the correction may be carried out at a predetermined interval during the scanning.

Furthermore, in the above description, the average value of the values obtained with all of the printing elements is defined as the image duty ratio. Instead, the printing element array may be divided into a predetermined number of groups. Then, the image duty ratios may be calculated for the respective groups, or in other words, for respective regions, and the heating intensity of the heater located in the vicinity of each group may be subjected to correction.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an embodiment of the present disclosure, it is possible to suppress a temperature variation of a supplied ink in a direction of a printing element array, and to achieve a stable state of ink ejection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-204941, filed Dec. 17, 2021, which is hereby incorporated by reference wherein in its entirety.

What is claimed is:

1. An ink jet printing apparatus comprising:

a print head including (1) a printing element array provided with printing elements each configured to generate thermal energy required to eject an ink, (2) a supply flow channel provided along the printing element array and configured to supply the ink to the respective printing elements, (3) an opening provided to the supply flow channel and configured to cause the ink to flow in, and (4) heating units provided along the supply flow channel and configured to heat the ink inside the supply flow channel; and a heating control unit configured to carry out heating control of the heating units based on a heating pattern determined based on heating intensity distribution, the heating intensity distribution representing heating intensities corresponding to the respective heating units and representing the heating intensities corresponding to positions in a direction of the printing element array, wherein the ink jet printing apparatus is operated in any of print modes having different printing conditions, wherein heating patterns are associated with the print modes in advance, respectively, and wherein the heating control unit carries out the heating control by using the heating pattern based on print mode information indicating the print mode that is set up.

2. The ink jet printing apparatus according to claim 1, wherein the heating intensity corresponding to the heating unit located at a position closest to the opening is higher than the heating intensity corresponding to the heating unit located at a position closest to an end portion of the printing element array.

3. The ink jet printing apparatus according to claim 1, wherein the heating intensity corresponding to the heating unit located at a position closest to the opening is highest of the heating intensities corresponding to the respective heating units.

4. The ink jet printing apparatus according to claim 1, wherein the heating intensity corresponding to each of the heating units in the heating pattern is determined based on a positional relation between the opening and the each of the heating units in the direction of the printing element array.

5. The ink jet printing apparatus according to claim 1, wherein the heating intensity distribution is determined based on temperature distribution of the ink inside the supply flow channel in a case where the ink is not heated with the heating units.

6. The ink jet printing apparatus according to claim 5, wherein a shape of the heating intensity distribution is an inverted shape of a shape of the temperature distribution.

7. The ink jet printing apparatus according to claim 1, wherein a number of passes is associated with each of the print modes, and wherein the heating intensity in the heating pattern is higher as the number of passes is smaller.

8. The ink jet printing apparatus according to claim 1, wherein a print quality is associated with each of the print modes, and wherein the heating intensity in the heating pattern is lower as the print quality is higher.

9. The ink jet printing apparatus according to claim 1, wherein a mask shape of a mask used in mask processing to divide image data into passes is associated with each of the print modes.

10. The ink jet printing apparatus according to claim 9, wherein the mask shape is any of a flat shape and a gradation shape.

11. The ink jet printing apparatus according to claim 10, wherein the heating intensity corresponding to the flat shape is higher than the heating intensity corresponding to the gradation shape in the heating pattern.

12. The ink jet printing apparatus according to claim 1, further comprising:

a carriage configured to mount the print head, wherein a scanning speed of the carriage is associated with each of the print modes, and wherein the heating intensity in the heating pattern is higher as the scanning speed is faster.

13. The ink jet printing apparatus according to claim 1, wherein a print medium is associated with each of the print modes, wherein the print medium is any of a polyvinyl chloride-based medium and a fabric-based medium, and wherein the heating intensity corresponding to the polyvinyl chloride-based medium is higher than the heating intensity corresponding to the fabric-based medium in the heating pattern.

14. The ink jet printing apparatus according to claim 1, further comprising:

a first obtaining unit configured to obtain first temperature information indicating a temperature of the ink supplied to the print head;

a second obtaining unit configured to obtain second temperature information indicating a temperature of the print head; and a calculation unit configured to calculate a temperature difference between the print head and the ink supplied to the print head.

15. The ink jet printing apparatus according to claim 14, wherein the heating control unit carries out the heating control by using the print mode indicated by the print mode information and the heating pattern based on the temperature difference calculated by the calculation unit.

16. The ink jet printing apparatus according to claim 1, wherein the ink jet printing apparatus modifies the heating pattern depending on a location of the opening in the direction of the printing element array.

17. The ink jet printing apparatus according to claim 1, further comprising:

an obtaining unit configured to obtain image duty ratio information; and a correction unit configured to correct the heating pattern by using an image duty ratio indicated by the image duty ratio information, wherein the heating control unit carries out the heating control by using the heating pattern corrected by the correction unit.

18. The ink jet printing apparatus according to claim 1, wherein the heating control is to control whether or not each of the heating units is to be driven.

19. The ink jet printing apparatus according to claim 1, wherein the print head includes (1) a collection flow channel provided along the printing element array and configured to collect the ink, and (2) a pump, and wherein the ink is circulated in order of the opening, the supply flow channel, the collection flow channel, and the pump.

20. A method for controlling an ink jet printing apparatus, the ink jet printing apparatus comprising: (A) a print head including (1) a printing element array provided with printing elements each configured to generate thermal energy required to eject an ink, (2) a supply flow channel provided along the printing element array and configured to supply the ink to the respective printing elements, (3) an opening provided to the supply flow channel and configured to cause the ink to flow in, and (4) heating units provided along the supply flow channel and configured to heat the ink inside the supply flow channel; and (B) a heating control unit configured to carry out heating control of the heating units, wherein the method comprises a step of, by the heating control unit, carrying out heating control of the heating units based on a heating pattern determined based on heating intensity distribution, the heating intensity distribution representing heating intensities corresponding to the respective heating units and representing the heating intensities corresponding to positions in a direction of the printing element array, wherein the ink jet printing apparatus is operated in any of print modes having different printing conditions, wherein heating patterns are associated with the print modes in advance, respectively, and wherein the heating control unit carries out the heating control by using the heating pattern based on print mode information indicating the print mode that is set up.

21. A non-transitory computer-readable storage medium storing a program which causes a computer to execute a method for controlling an ink jet printing apparatus, the ink jet printing apparatus comprising: (A) a print head including (1) a printing element array provided with printing elements each configured to generate thermal energy required to eject an ink, (2) a supply flow channel provided along the printing element array and configured to supply the ink to the respective printing elements, (3) an opening provided to the supply flow channel and configured to cause the ink to flow in, and (4) heating units provided along the supply flow channel and configured to heat the ink inside the supply flow channel; and (B) a heating control unit configured to carry out heating control of the heating units, wherein the method comprises a step of, by the heating control unit, carrying out heating control of the heating units based on a heating pattern determined based on heating intensity distribution, the heating intensity distribution representing heating intensities corresponding to the respective heating units and representing the heating intensities corresponding to positions in a direction of the printing element array, wherein the ink jet printing apparatus is operated in any of print modes having different printing conditions, wherein heating patterns are associated with the print modes in advance, respectively, and wherein the heating control unit carries out the heating control by using the heating pattern based on print mode information indicating the print mode that is set up.

22. An ink jet printing apparatus comprising:

a print head including (1) a printing element array provided with printing elements each configured to generate thermal energy required to eject an ink, (2) a supply flow channel provided along the printing element array and configured to supply the ink to the respective printing elements, (3) an opening provided to the supply flow channel and configured to cause the ink to flow in, and (4) heating units provided along the supply flow channel and configured to heat the ink inside the supply flow channel;

a heating control unit configured to carry out heating control of the heating units based on a heating pattern determined based on heating intensity distribution, the heating intensity distribution representing heating intensities corresponding to the respective heating units and representing the heating intensities corresponding to positions in a direction of the printing element array;

an obtaining unit configured to obtain image duty ratio information; and a correction unit configured to correct the heating pattern by using an image duty ratio indicated by the image duty ratio information, wherein the heating control unit carries out the heating control by using the heating pattern corrected by the correction unit.

23. A method for controlling an ink jet printing apparatus, the ink jet printing apparatus comprising: (A) a print head including (1) a printing element array provided with printing elements each configured to generate thermal energy required to eject an ink, (2) a supply flow channel provided along the printing element array and configured to supply the ink to the respective printing elements, (3) an opening provided to the supply flow channel and configured to cause the ink to flow in, and (4) heating units provided along the supply flow channel and configured to heat the ink inside the supply flow channel; (B) a heating control unit configured to carry out heating control of the heating units based on a heating pattern; (C) an obtaining unit configured to obtain image duty ratio information; and (D) a correction unit configured to correct the heating pattern by using an image duty ratio indicated by the image duty ratio information, wherein the method comprises a step of, by the heating control unit, carrying out heating control of the heating units based on a heating pattern that is (a) determined based on heating intensity distribution, the heating intensity distribution representing heating intensities corresponding to the respective heating units and representing the heating intensities corresponding to positions in a direction of the printing element array, and (b) corrected by the correction unit.

24. A non-transitory computer-readable storage medium storing a program which causes a computer to execute a method according to claim 23.

* * * * *